(12) United States Patent
Huang et al.

(10) Patent No.: US 9,887,774 B2
(45) Date of Patent: Feb. 6, 2018

(54) DEVICE AND METHOD FOR MONITORING TRANSMISSION CHARACTERISTICS

(71) Applicant: FUJITSU LIMITED, Kawasaki-shi, Kanagawa (JP)

(72) Inventors: Guoxiu Huang, Kawasaki (JP); Yasuhiko Aoki, Yokohama (JP); Shoichiro Oda, Fuchu (JP); Setsuo Yoshida, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/457,150

(22) Filed: Mar. 13, 2017

(65) Prior Publication Data
US 2017/0279528 A1 Sep. 28, 2017

(30) Foreign Application Priority Data
Mar. 25, 2016 (JP) ................................ 2016-062619

(51) Int. Cl.
*H04B 10/07* (2013.01)
*H04B 10/079* (2013.01)
(Continued)

(52) U.S. Cl.
CPC ..... *H04B 10/07955* (2013.01); *H04B 10/548* (2013.01); *H04J 14/0212* (2013.01)

(58) Field of Classification Search
CPC ............. H04B 10/07955; H04B 10/548; H04J 14/0212
(Continued)

(56) References Cited

U.S. PATENT DOCUMENTS 5,282,074 A * 1/1994 Miyazaki .............. H01S 3/0014
398/177
5,513,029 A * 4/1996 Roberts ................ H04B 10/035
398/197
(Continued)

FOREIGN PATENT DOCUMENTS

JP 2014-143614 8/2014
WO 2013/140493 A1 9/2013

OTHER PUBLICATIONS

Wellbrock et al, In Service Chromatic Dispersion and Pass Band Shape Measurements for Light Path with Modulated ASE Source, 2010, OSA, All Document.*

(Continued)

*Primary Examiner* — Ken N Vanderpuye
*Assistant Examiner* — Dibson Sanchez
(74) *Attorney, Agent, or Firm* — Staas & Halsey LLP

(57) ABSTRACT

A transmission characteristics monitoring device monitors transmission characteristics of an optical transmission path between nodes. The device detects an average power of the frequency modulated optical signal and a slope of the transmission characteristics; generates a slope function that represents a slope of the transmission characteristics between first and second frequencies; generates a corrected power value by adding an integral of the slope function to a first power measurement value detected at the first frequency; calculates the transmission characteristics at the second frequency based on a second power measurement value detected at the second frequency when the difference between the second power measurement value and the corrected power value is smaller than a specified threshold; and calculates the transmission characteristics at the second frequency based on the corrected power value when the difference is greater than the specified threshold.

6 Claims, 19 Drawing Sheets

(51) Int. Cl.
*H04B 10/548* (2013.01)
*H04J 14/02* (2006.01)

(58) Field of Classification Search
USPC .................................................... 398/9–38
See application file for complete search history.

(56) References Cited

U.S. PATENT DOCUMENTS

| | | | | |
|---|---|---|---|---|
| 5,717,510 A * | 2/1998 | Ishikawa | ............ | H04B 10/0795 398/147 |
| 5,999,258 A * | 12/1999 | Roberts | ............ | H04B 10/07951 356/450 |
| 6,088,144 A * | 7/2000 | Doerr | .................. | H04B 10/077 398/1 |
| 6,178,025 B1 * | 1/2001 | Hardcastle | ........... | H04B 10/077 398/17 |
| 6,735,395 B1 * | 5/2004 | Bai | ...................... | H04B 10/504 398/196 |
| 6,952,529 B1 * | 10/2005 | Mittal | .............. | H04B 10/07953 398/25 |
| 7,254,325 B2 * | 8/2007 | Hoshida | ............... | H04B 10/077 398/25 |
| 8,655,196 B2 * | 2/2014 | Fludger | ................ | H04B 10/677 398/202 |
| 2002/0126351 A1 * | 9/2002 | Chung | ................ | H04B 10/077 398/29 |
| 2002/0131104 A1 * | 9/2002 | Johnson | ............... | H04B 10/077 398/34 |
| 2002/0154352 A1 * | 10/2002 | Kinoshita | ............ | H04B 10/032 398/141 |
| 2003/0086713 A1 * | 5/2003 | Inui | .................... | H04B 10/2519 398/199 |
| 2004/0114923 A1 * | 6/2004 | Chung | ................ | H04B 10/077 398/26 |
| 2004/0126108 A1 * | 7/2004 | Chung | ................ | H04B 10/077 398/26 |
| 2004/0156038 A1 * | 8/2004 | Cao | ...................... | G01J 1/4257 356/73.1 |
| 2004/0247319 A1 * | 12/2004 | Melman | ............... | H04B 10/077 398/65 |
| 2007/0297043 A1 * | 12/2007 | Kao | .................. | H04B 10/07953 359/337 |
| 2008/0063408 A1 * | 3/2008 | Pape | .................... | G01M 11/333 398/141 |
| 2008/0138065 A1 * | 6/2008 | Fukuchi | ............... | H04B 10/677 398/25 |
| 2008/0232760 A1 * | 9/2008 | Xia | .................... | H04B 10/0775 385/140 |
| 2009/0267778 A1 * | 10/2009 | Takeshita | ......... | H04B 10/07953 398/25 |
| 2009/0324219 A1 * | 12/2009 | Jiang | .................. | H04J 14/0221 398/34 |
| 2010/0266275 A1 * | 10/2010 | Xia | .................... | H04B 10/0773 398/16 |
| 2013/0188967 A1 * | 7/2013 | Eiselt | .................. | H04L 25/4906 398/140 |
| 2013/0251365 A1 * | 9/2013 | Sone | ....................... | H04B 17/00 398/38 |
| 2013/0302031 A1 * | 11/2013 | Tanimura | ........... | H04B 10/5057 398/38 |
| 2014/0140692 A1 * | 5/2014 | Oda | .................... | H04B 10/5057 398/23 |
| 2014/0205281 A1 | 7/2014 | Sone et al. | | |
| 2014/0348464 A1 | 11/2014 | Kamura et al. | | |
| 2015/0155934 A1 * | 6/2015 | Nakagawa | ......... | H04B 10/0775 398/34 |
| 2016/0087393 A1 * | 3/2016 | Rapp | ................... | H01S 3/06754 398/38 |

OTHER PUBLICATIONS

Gringeri et al, Flexible Architectures for Optical Transport Nodes and Networks, 2010, IEEE, All Document.*
Huang et al., Pass-band shape monitor for minimizing impact of signal filtering in cascaded ROADMs, Asia Communications and Photonics Conference 2015, AM1E.4, 2015, 3 pp.
Pulikkaseril et al., Spectral modeling of channel band shapes in wavelength selective switches, Optics Express, vol. 19, No. 9, pp. 8458-8470, 2011.

* cited by examiner

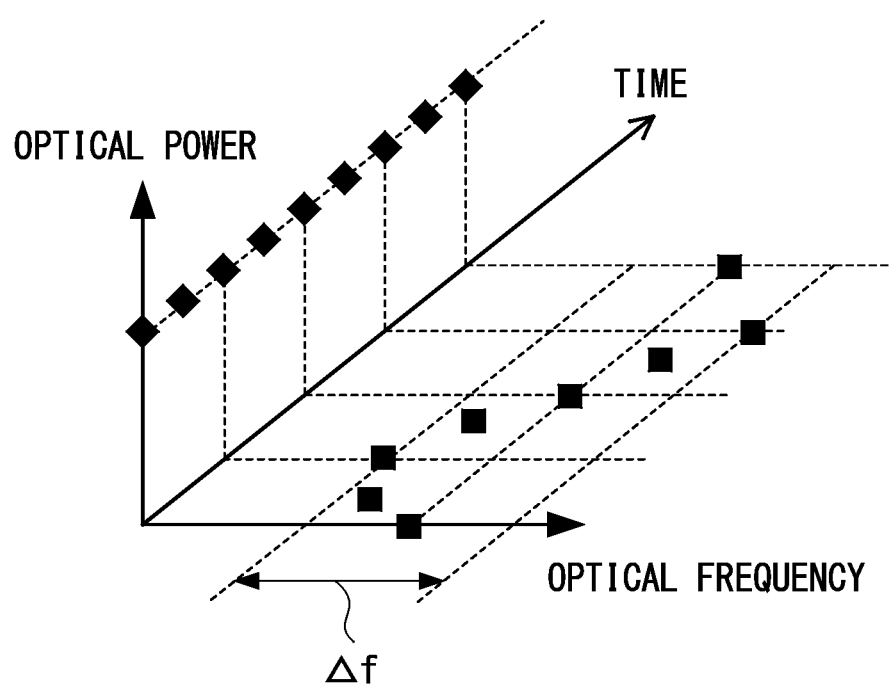
F I G. 2

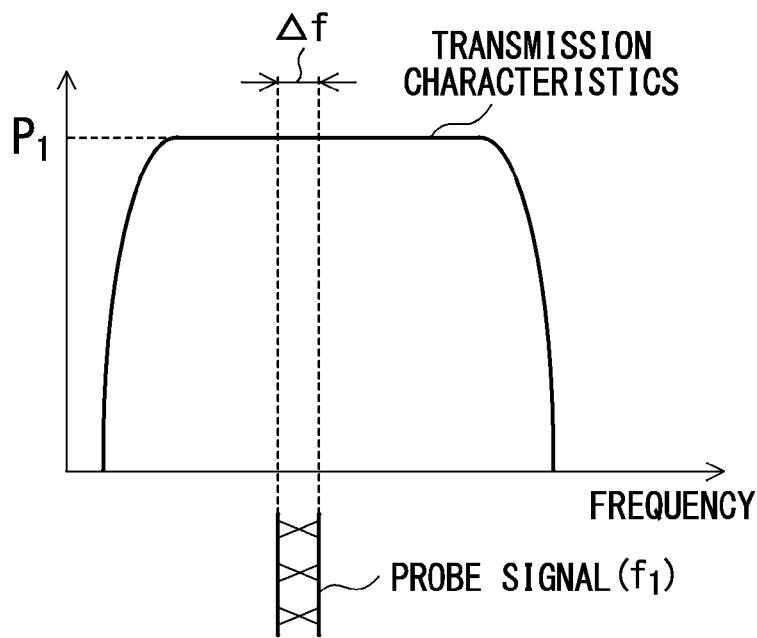
F I G. 3 A
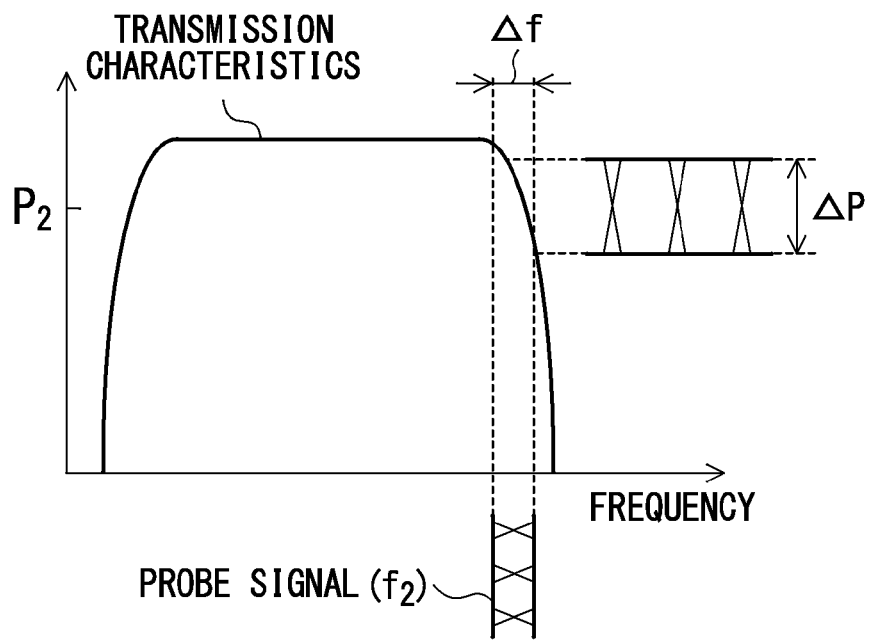
F I G. 3 B

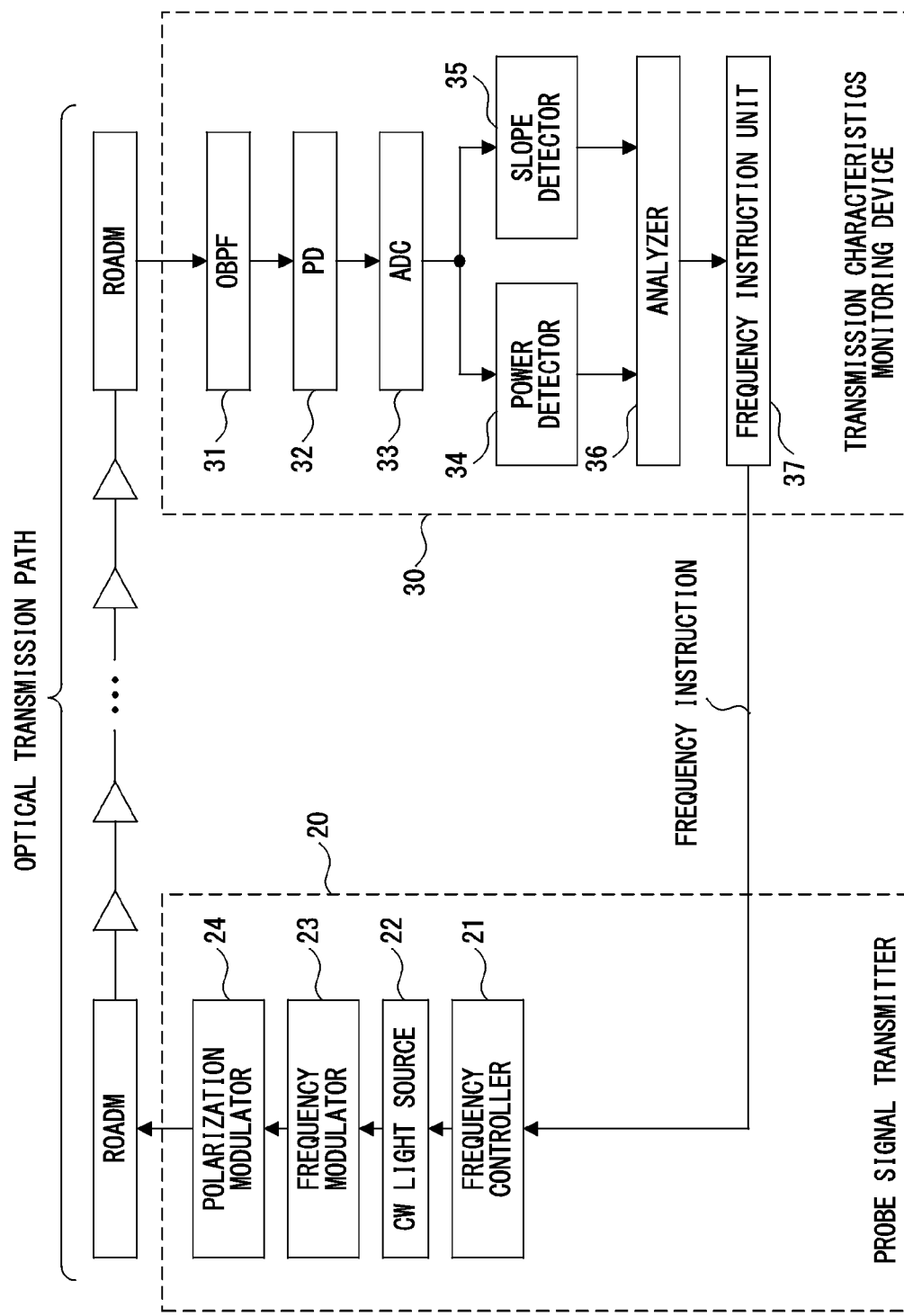
F I G. 7

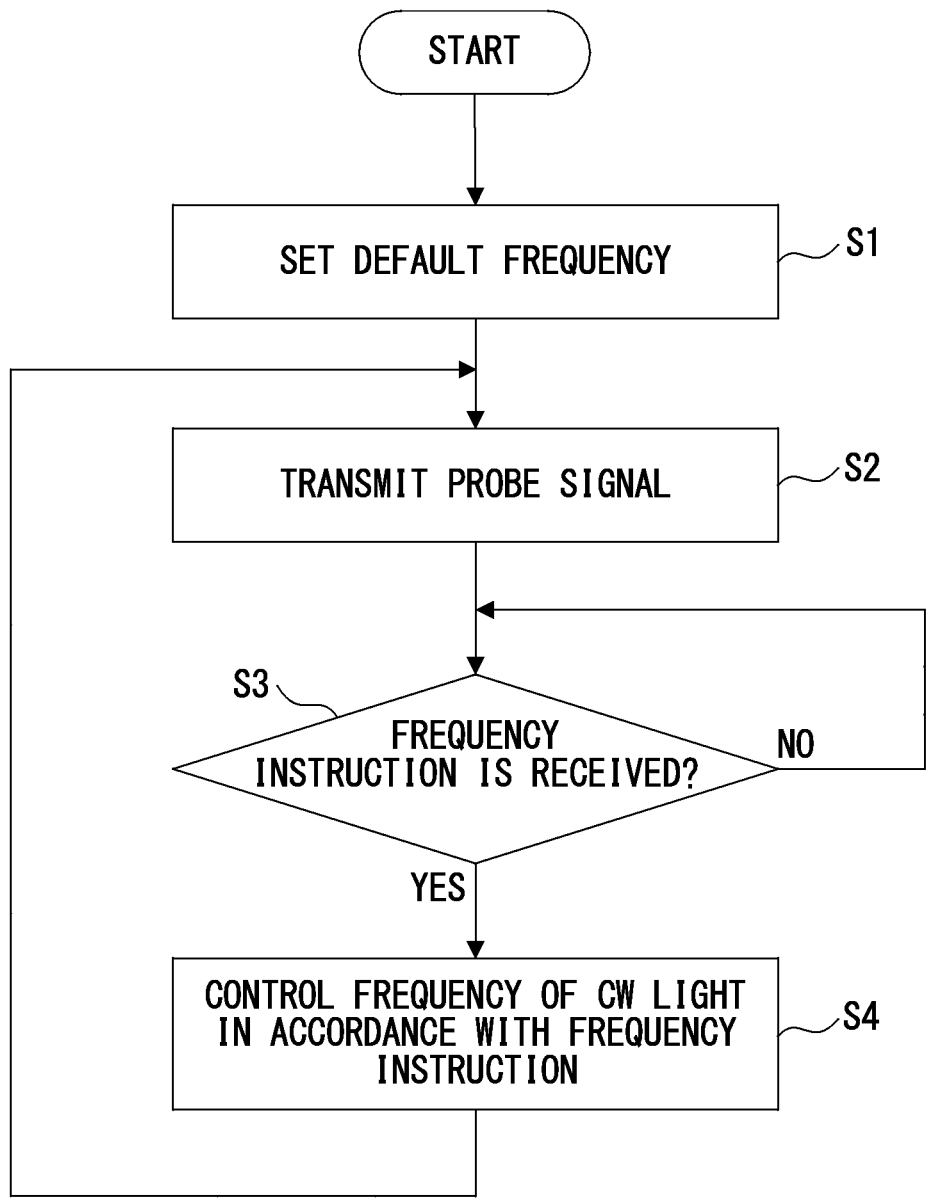
F I G. 8

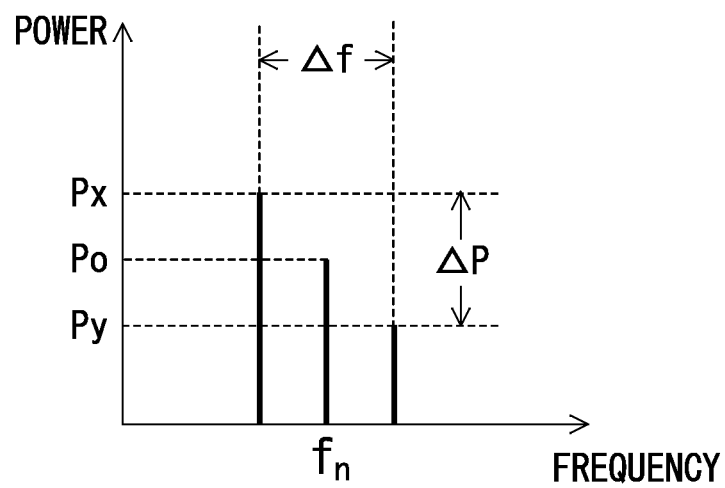
F I G. 1 1 A
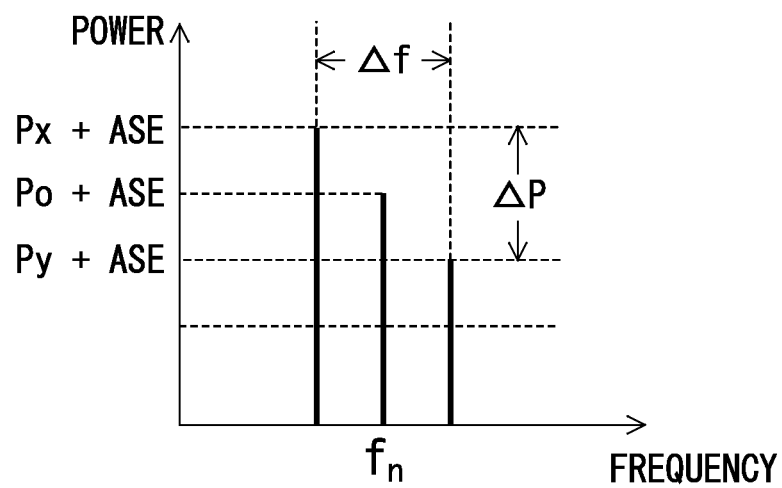
F I G. 1 1 B

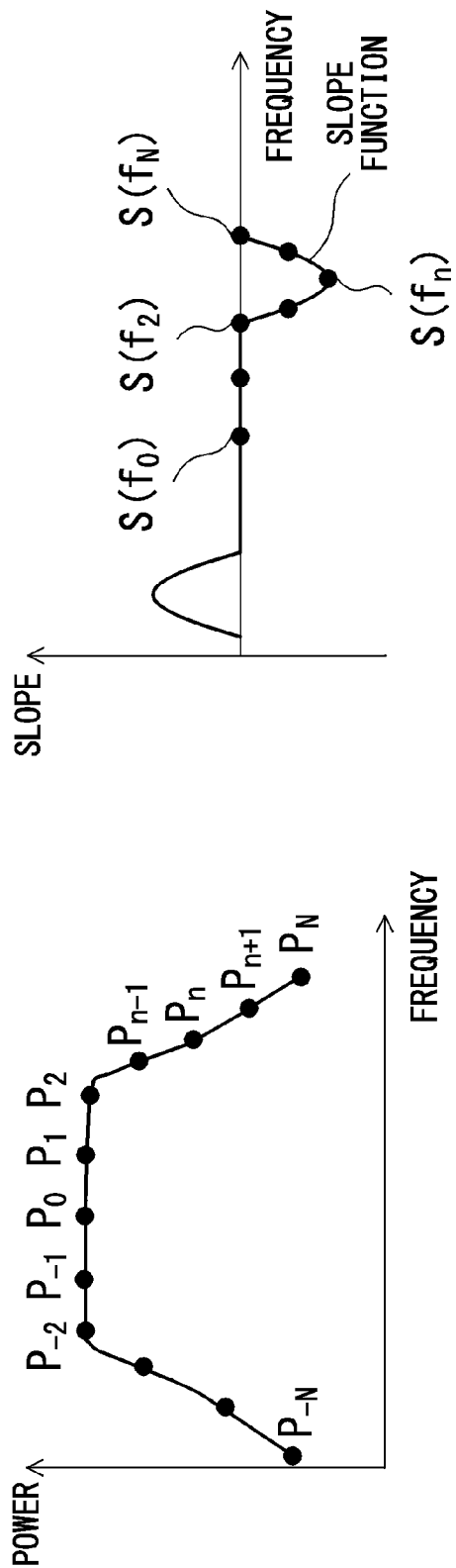

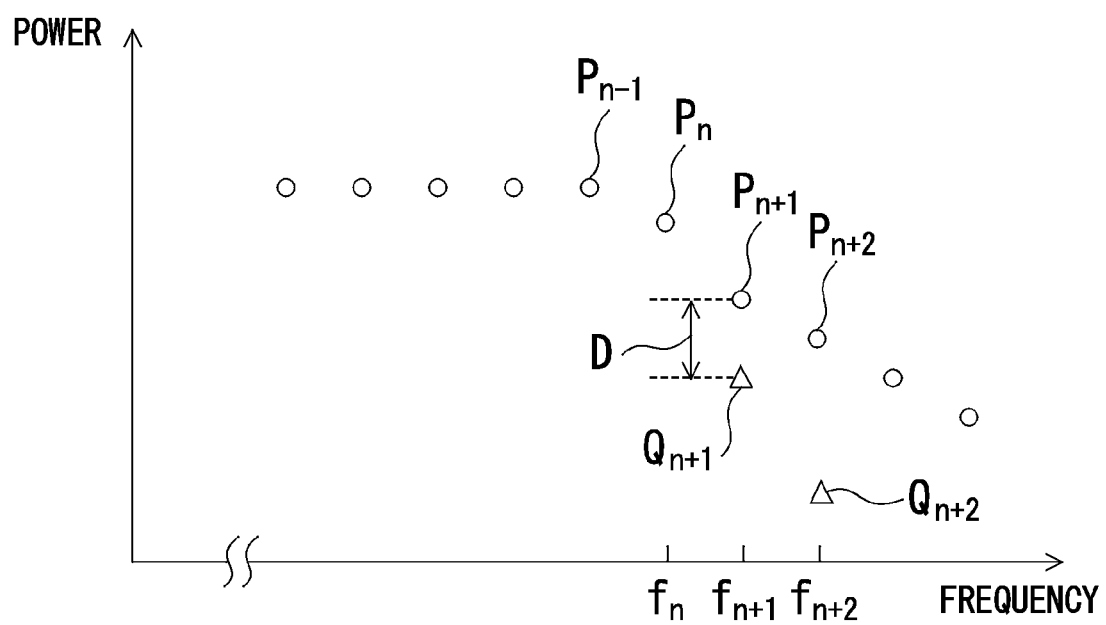
F I G. 13

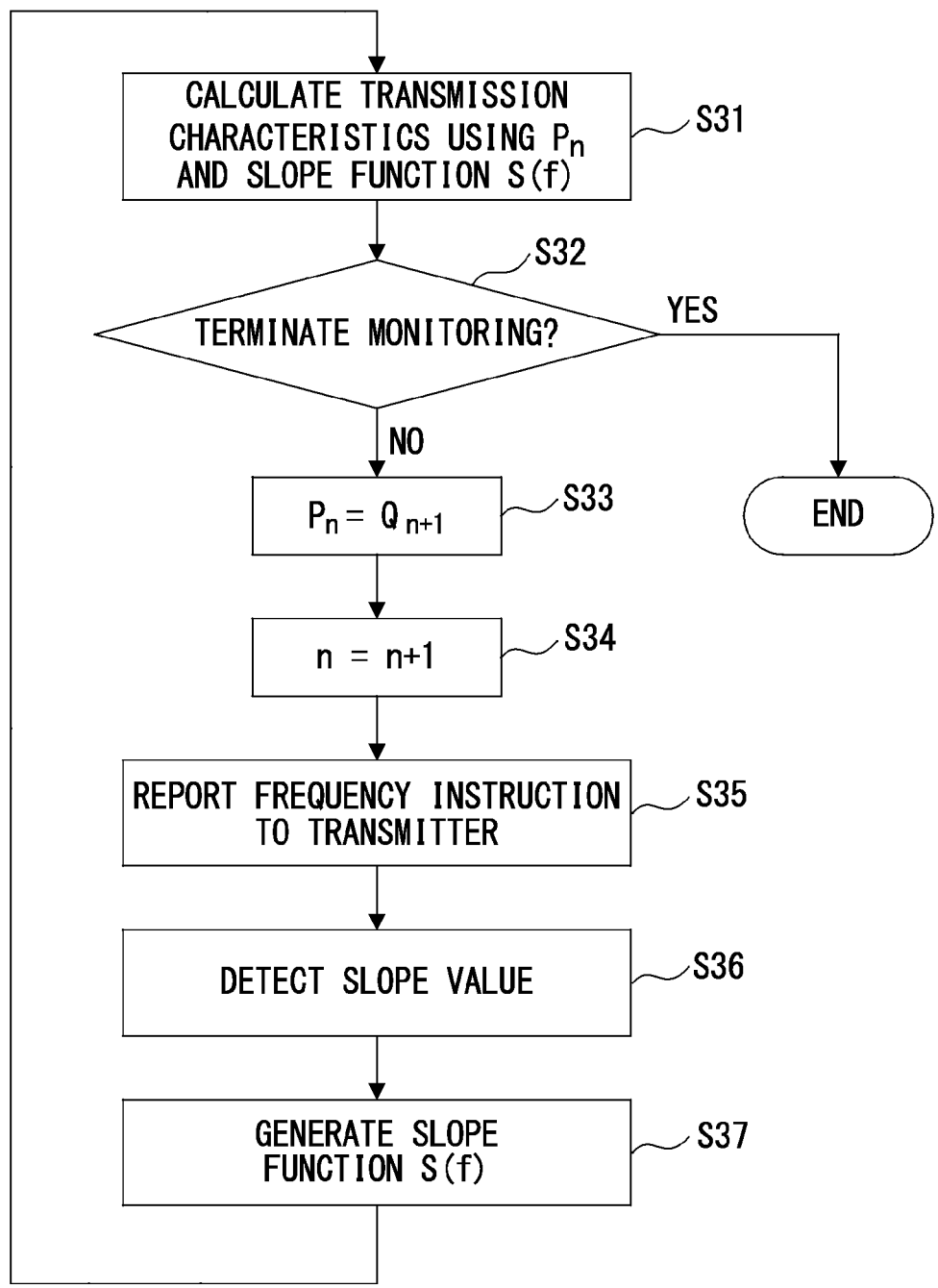
F I G. 1 6

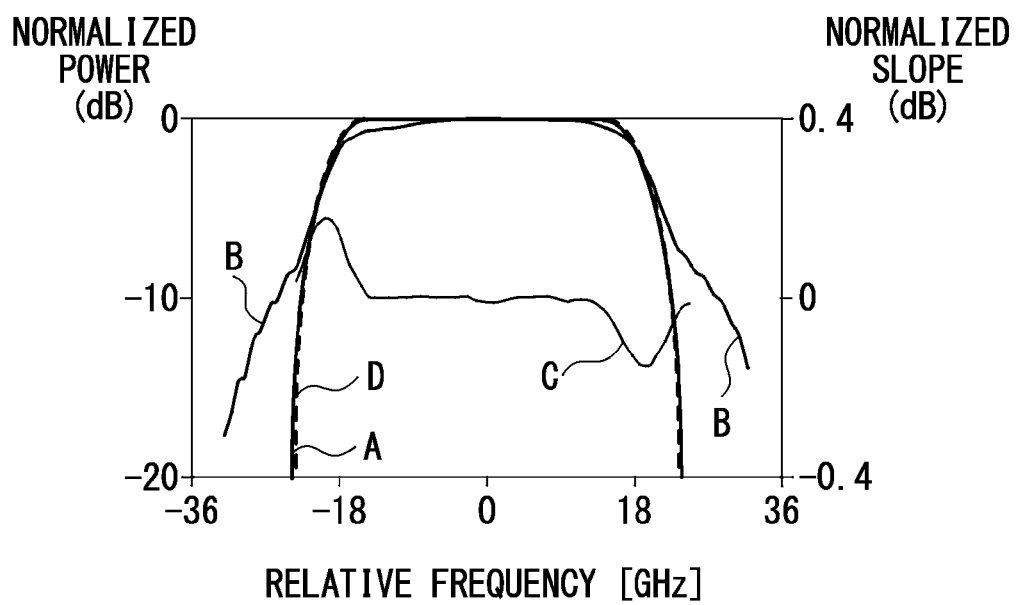
F I G. 1 7 A
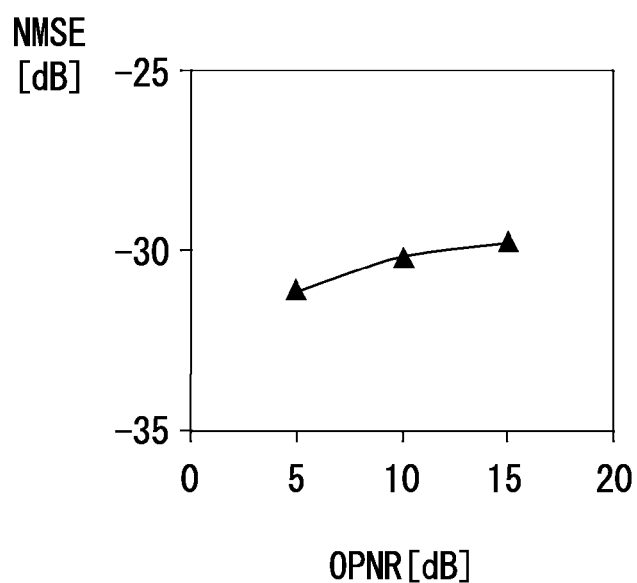
F I G. 1 7 B

DEVICE AND METHOD FOR MONITORING TRANSMISSION CHARACTERISTICS

CROSS-REFERENCE TO RELATED APPLICATION

This application is based upon and claims the benefit of priority of the prior Japanese Patent Application No. 2016-062619, filed on Mar. 25, 2016, the entire contents of which are incorporated herein by reference.

FIELD

The embodiments discussed herein are related to a device and a method for monitoring transmission characteristics of an optical transmission path.

BACKGROUND

As a technique for realizing a large capacity communication network, a wavelength division multiplexing (WDM) has spread widely. WDM is capable of transmitting a plurality of signals using a plurality of wavelength channels.

A reconfigurable optical add-drop multiplexer (ROADM) is implemented in each node of a WDM network that transmits a WDM optical signal. The ROADM includes a wavelength selective switch (WSS) and individually processes each optical signal multiplexed in the WDM optical signal. Specifically, the ROADM drops an optical signal of a desired wavelength from the WDM optical signal. Further, the ROADM adds an optical signal to an idle channel of the WDM optical signal.

In the WDM network, while being transmitted from a transmission station to a reception station, an optical signal of each wavelength channel passes through one or a plurality of ROADMs. At this time, the optical signal passes through the WSS in each node. When a WSS passes an optical signal in a specified wavelength channel, the WSS provides a pass band to the specified wavelength channel. A width of the pass band is determined, for example, based on a spacing of a wavelength grid of the WDM network.

However, in a case in which an optical signal passes through a plurality of WSSs, a pass band of an optical transmission path for the optical signal maybe narrowed. This phenomenon may be called pass-band narrowing (PBN). Further, the pass-band narrowings differ from each other in accordance with a route between a source node and a destination node. That is, the transmission characteristics of the optical transmission path differ from each other in accordance with the route between the source node and the destination node. Accordingly, to improve communication quality, it is requested to monitor the transmission characteristics of the optical transmission path for respective routes.

As a related technology, a device and a method are proposed for monitoring a transmission wavelength band of a wavelength tunable optical filter (for example, Japanese Laid-open Patent Publication No. 2014-143614). A method for monitoring a pass band of a WSS is proposed (for example, WO2013/140493). Further, a method for calculating a shape of a pass band of an optical transmission path is proposed (for example, the following documents 1 and 2).
Document 1: Guoxiu Huang et al., Pass-band shape monitor for minimizing impact of signal filtering in cascaded ROADMs, Asia Communications and Photonics Conference 2015, AM1E.4

Document 2: Cibby Pulikkaseril et al., Spectral modeling of channel band shapes in wavelength selective switch, OPTICS EXPRESS, Vol. 19, No. 9, pp. 8458-8470, 2011

The transmission characteristics of the optical transmission path are obtained by measuring a power of probe light. For example, a transmitter transmits probe light. The probe light is transmitted to a receiver through the optical transmission path. Here, a wavelength of the probe light is swept in a wavelength range of a target wavelength channel. Note that a transmission power of the probe light is constant. The receiver measures a received power of the probe light. Then measured values of the received power are plotted for each wavelength and thereby a pass-band shape (PNS) is detected with respect to the target wavelength channel.

However, an optical amplifier implemented in each relay node generates optical noise. For example, an erbium-doped fiber amplifier (EDFA) generates amplified spontaneous emission (ASE) noise. Therefore, when the probe light is transmitted from the transmitter for monitoring the transmission characteristics of the optical transmission path, the receiver detects the probe light and the ASE noise. Thus, a measurement value of the received power of the probe light includes an error caused by the noise. Accordingly, in an environment in which optical noise (particularly, ASE noise) is generated in the optical transmission path, it is difficult to accurately monitor the transmission characteristics of the optical transmission path.

SUMMARY

According to an aspect of the present invention, a transmission characteristics monitoring device that monitors transmission characteristics of an optical transmission path between a first node and a second node, the transmission characteristics monitoring device comprising: a photo detector configured to convert a frequency modulated optical signal transmitted from a transmitter implemented in the first node into an electric signal in the second node; and a processor. The processor is configured to: detect an average power of the frequency modulated optical signal based on the electric signal, detect an amplitude of a power variation of the frequency modulated optical signal based on the electric signal, detect a slope of the transmission characteristics with respect to a frequency based on the detected amplitude, obtain a first power measurement value that indicates an average power detected when a center frequency of the frequency modulated optical signal is a first frequency, obtain a first slope value that indicates a slope detected when the center frequency of the frequency modulated optical signal is the first frequency, obtain a second power measurement value that indicates an average power detected when the center frequency of the frequency modulated optical signal is a second frequency, obtain a second slope value that indicates a slope detected when the center frequency of the frequency modulated optical signal is the second frequency, generate a slope function that represents a slope of the transmission characteristics with respect to a frequency for a frequency range between the first frequency and the second frequency based on the first slope value and the second slope value, calculate an integral of the slope function for the frequency range, generate a corrected power value by adding the integral of the slope function to the first power measurement value, determine whether a difference between the second power measurement value and the corrected power value is greater than a specified threshold, calculate the transmission characteristics at the second frequency based on the second power measurement value when the difference is smaller than the specified threshold, and calculate the transmission characteristics at the second frequency based on the corrected power value when the difference is greater than the specified threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a probe signal.

FIGS. 3A and 3B illustrate a state of probe light received via an optical transmission path.

FIG. 7 illustrates an example of the transmission characteristics monitoring system.

FIG. 8 is a flowchart illustrating an example of operations of a probe signal transmitter.

FIGS. 11A and 11B illustrate a relationship between a slope of the transmission characteristics and ASE noise.

FIGS. 12A and 12B illustrate a method for calculating the slope of the transmission characteristics.

FIG. 13 illustrates correction of the transmission characteristics.

FIG. 16 is a flowchart illustrating an example of the process in which the transmission characteristics are calculated while eliminating an influence of ASE noise.

FIGS. 17A and 17B illustrate an example of experimental results on a measurement of the transmission characteristics.

DESCRIPTION OF EMBODIMENTS

Figure 1:
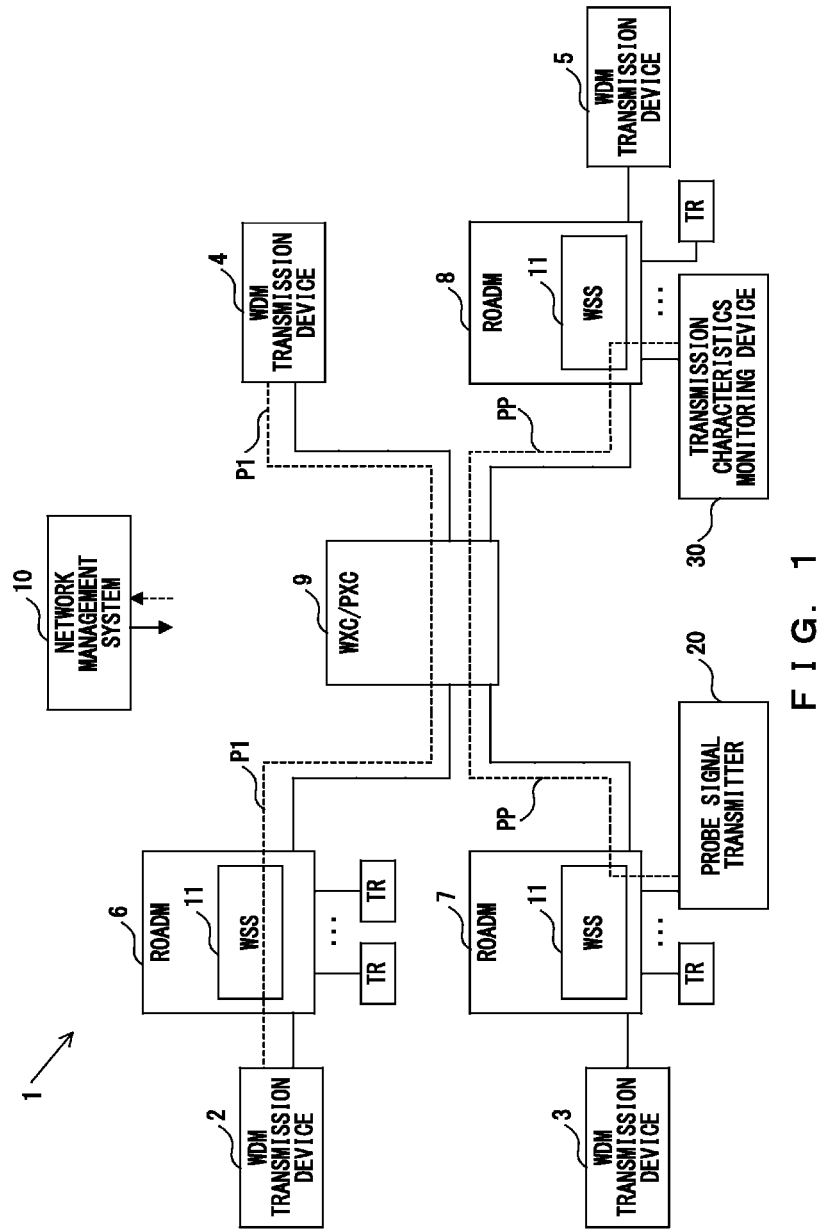
FIG. 1 illustrates an example of a communication network in which a transmission characteristics monitoring system is used.

FIG. 1 illustrates an example of a communication network in which a transmission characteristics monitoring system according to an embodiment of the present invention is used. The communication network 1 illustrated in FIG. 1 includes WDM transmission devices 2-5, reconfigurable optical add/drop multiplexers (ROADMs) 6-8, a photonic cross connect/wavelength cross connect (PXC/WXC) 9, and a network management system (NMS) 10.

The WDM transmission devices 2, 3, and 5 are connected to the ROADMs 6, 7, and 8 through optical fiber lines, respectively. The ROADMs 6, 7, and 8 are respectively connected to the PXC/WXC 9 through the optical fiber lines.

The WDM transmission device 4 is connected to the PXC/WXC 9 through the optical fiber line. One or a plurality of relay nodes may be provided in each optical fiber line. An optical amplifier (for example, an EDFA) is implemented in each relay node.

The WDM transmission devices 2-5 can transmit and receive a WDM optical signal. A plurality of wavelength channels are multiplexed in the WDM optical signal. That is, the WDM optical signal includes a plurality of optical signals of different wavelengths. The ROADMs 6-8 each include a wavelength selective switch (WSS) 11 and can process an optical signal for each wavelength channel. Specifically, the ROADMs 6-8 can pass an optical signal of a specified wavelength channel in an input WDM optical signal. In addition, the ROADMs 6-8 can drop an optical signal of a specified wavelength from the input WDM optical signal and guide the optical signal to a client line. Further, the ROADMs 6-8 can add an optical signal generated by a client to the WDM optical signal. The PXC/WXC 9 is equipped with a plurality of input ports and a plurality of output ports and guides an input signal to an output port so as to realize a specified optical path.

A network management system 10 manages a state of the communication network 1 and controls the WDM transmission devices 2-5, the ROADMs 6-8, and the PXC/WXC 9. For example, the network management system 10 controls the WDM transmission devices 2-5, the ROADMs 6-8, and the PXC/WXC 9 so as to establish an optical transmission path requested by a user. Further, the network management system 10 can collect desired information from the WDM transmission devices 2-5, the ROADMs 6-8, and the PXC/WXC 9.

In an example illustrated in FIG. 1, an optical transmission path P1 is established in the communication network 1. The optical transmission path is indicated using a broken line. The optical transmission path P1 transmits an optical signal from the WDM transmission device 2 to the WDM transmission device 4 via the ROADM 6 and the PXC/WXC 9. Note that the optical transmission path P1 may transmit an optical signal bidirectionally.

In the communication network 1, the transmission characteristics monitoring system according to the embodiment of the present invention can monitor transmission characteristics of the optical transmission path between desired nodes. As illustrated in FIG. 1, the transmission characteristics monitoring system includes a probe signal transmitter 20 and a transmission characteristics monitoring device 30. In this example, the transmission characteristics of an optical transmission path that is established between the node in which the ROADM 7 is implemented and the node in which the ROADM 8 is implemented are monitored. Accordingly, the probe signal transmitter 20 is connected to the ROADM 7 and the transmission characteristics monitoring device 30 is connected to the ROADM 8.

The probe signal transmitter 20 generates a probe signal of a specified optical frequency. The network management system 10 established an optical transmission path PP for transmitting the probe signal from the probe signal transmitter 20 to the transmission characteristics monitoring device 30. For example, when a center frequency of the probe signal is $f_c$, path information for transmitting light of the frequency $f_c$ from the probe signal transmitter 20 to the transmission characteristics monitoring device 30 is generated. By doing this, the ROADM 7, the PXC/WXC 9, and the ROADM 8 establish the optical transmission path PP in accordance with that path information.

The transmission characteristics monitoring device 30 measures a received power of the probe signal and thereby monitors the transmission characteristics of the optical transmission path PP. For example, the transmission characteristics monitoring device 30 monitors a shape of a pass band (namely, a pass-band shape) of the optical transmission path PP.

Next, an outline of a method for monitoring the transmission characteristics of the optical transmission path will be described. When monitoring the transmission characteristics of the optical transmission path, the probe signal transmitter 20 generates a probe signal illustrated in FIG. 2. The probe signal may be generated by modulating continuous wave (CW) light using an electric signal of a specified frequency. That is, the probe signal is a frequency modulated optical signal. $\Delta f$ represents an FM modulation index. Therefore, when an optical frequency of the CW light is $f_c$, the optical frequency of the probe light varies between $f_c-\Delta f/2$ and $f_c+\Delta f/2$. It is assumed that an optical power of the probe signal output from the probe signal transmitter 20 is constant.

The probe signal transmitted from the probe signal transmitter 20 is transmitted to the transmission characteristics monitoring device 30 through a target optical transmission path. Here, the target optical transmission path is assumed to have the transmission characteristics illustrated in FIGS. 3A or 3B.

When the probe signal is arranged in a frequency range in which the transmission characteristics are flat, a power of the probe signal is kept approximately constant in the transmission characteristics monitoring device 30. In the example illustrated in FIG. 3A, the center frequency of the probe signal is $f_1$ and the received power is $P_1$.

When the probe signal is arranged in the frequency range in which the transmission characteristics have a slope, the power of the probe signal varies in accordance with a slope of the transmission characteristics in the transmission characteristics monitoring device 30. In the example illustrated in FIG. 3B, the center frequency of the probe signal is $f_2$ and an amplitude of the power variation of the probe signal is $\Delta P$. An average received power is $P_2$. The amplitude $\Delta P$ corresponds to a difference between the received power at the time when a frequency of the probe signal is $f_2-\Delta f/2$ and the received power at the time when a frequency of the probe signal is $f_2+\Delta f/2$. In this case, a slope S of the transmission characteristics at the center frequency $f_2$ is represented by $\Delta P/\Delta f$. It is assumed that the FM frequency index $\Delta f$ is constant. Therefore, when the amplitude of the power variation of the probe signal is measured, the slope S of the transmission characteristics is calculated.

The transmission characteristics monitoring system measures an average power P and the slope S at a plurality of measurement points while sweeping the center frequency of the probe signal. Then, the transmission characteristics monitoring device 30 specifies the transmission characteristics of the optical transmission path based on a plurality of measurement results.

Here, the average power of the probe signal in the transmission characteristics monitoring device 30 is assumed to be expressed using a third-order polynomial formula. Specifically, an average power $P_{av}(f)$ is assumed to be expressed using formula (1), where "f" represents a frequency.

$$P_{av}(f)=af^3+bf^2+cf+d \tag{1}$$

The transmission characteristics T(f) of the optical transmission path are assumed to be obtained by normalizing the average power $P_{av}(f)$ using a maximum value $\max(P_{av})$ of the received power of the probe signal. In this case, the transmission characteristics T(f) are expressed using the following formula (2).

$$T(f)=P_{av}(f)/\max(P_{av}) \tag{2}$$

Note hereinafter that the transmission characteristics T(f) are assumed to be equivalent to the average power $P_{av}(f)$ for ease of explanation. In this case, the slope S(f) of the transmission characteristics is expressed using the following formula (3).

$$S(f)=dT(f)/df=3af^2+2bf+c \tag{3}$$

Under the above-described conditions, parameters a, b, c, and d are expressed using the following formula (4).

$$\begin{pmatrix} a_n \\ b_n \\ c_n \\ d_n \end{pmatrix} = \begin{pmatrix} f_n^3 & f_n^2 & f_n & 1 \\ f_{n+1}^3 & f_{n+1}^2 & f_{n+1} & 1 \\ 3f_n^2 & 2f_n & 1 & 0 \\ 3f_{n+1}^2 & 2f_{n+1} & 1 & 0 \end{pmatrix}^{-1} \begin{pmatrix} P_n \\ P_{n+1} \\ S_n \\ S_{n+1} \end{pmatrix} \tag{4}$$

$f_n$ represents the center frequency of the probe signal at a measurement point n.
$f_{n+1}$ represents the center frequency of the probe signal at a measurement point n+1.
$P_n$ represents the average power measured at the measurement point n.
$P_{n+1}$ represents the average power measured at the measurement point n+1.
$S_n$ represents the slope of the transmission characteristics measured at the measurement point n.
$S_{n+1}$ represents the slope of the transmission characteristics measured at the measurement point n+1.

The probe signal transmitter 20 controls the center frequency of the probe signal to the frequency $f_n$ and the transmission characteristics monitoring device 30 measures the average power $P_n$ and the slope $S_n$. Further, the probe signal transmitter 20 controls the center frequency of the probe signal to the frequency $f_{n+1}$ and the transmission characteristics monitoring device 30 measures the average power $P_{n+1}$ and the slope $S_{n+1}$. Then, these measurement results are put into formula (4) and thereby parameters $a_n$, $b_n$, $c_n$, and $d_n$ are calculated. The calculated parameters are put into formula (3). As a result, the transmission characteristics of the optical transmission path in the frequency range between $f_n$ and $f_{n+1}$ are obtained.

Figure 4:
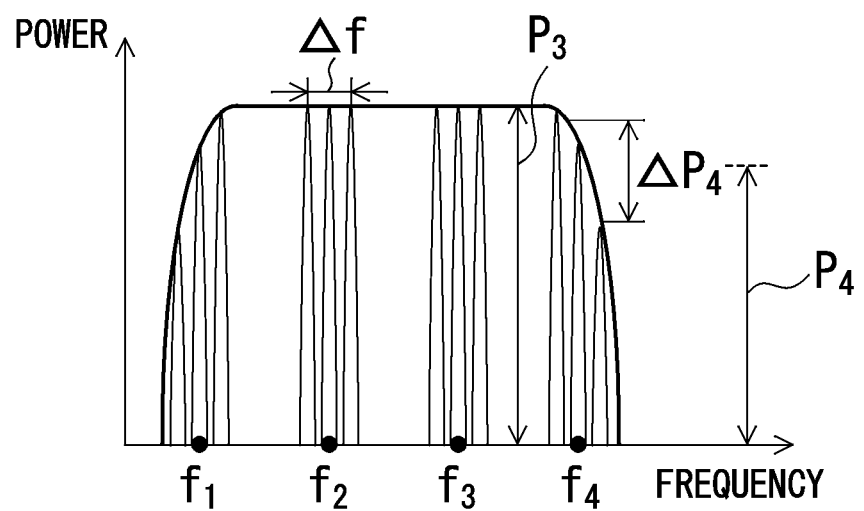
FIG. 4 illustrates an example of a procedure for monitoring transmission characteristics.

FIG. 4 illustrates an example of a procedure for monitoring the transmission characteristics. In this example, the average power P and the slope S are respectively measured at four measurement points $f_1$, $f_2$, $f_3$, and $f_4$. As described above, the slope S is calculated by $\Delta P/\Delta f$. The amplitude $\Delta P$ represents the amplitude of the power variation of the probe signal and is obtained by the measurement. $\Delta f$ represents the FM modulation index and is determined in advance.

Since the FM modulation index $\Delta f$ is constant in this example, when the amplitude $\Delta P_n$ is measured at the measurement point n, the slope $S_n$ at the frequency $f_n$ is calculated. Accordingly, a process of calculating the slope $S_n$ from the amplitude $\Delta P_n$ measured at the measurement point n may be described as "measuring the slope $S_n$". Further, the slope calculated from the measurement value of the amplitude may be described as a "slope measurement value".

The transmission characteristics are calculated based on the measurement results of two adjacent measurement points. For example, the average power $P_3$ and the amplitude $\Delta P_3$ are measured at the frequency $f_3$. In this example, the transmission characteristics are approximately flat with respect to the frequency at the frequency $f_3$. Therefore, the amplitude $\Delta P_3$ is approximately zero and is not illustrated in FIG. 4. Next, the average power $P_4$ and the amplitude $\Delta P_4$ are measured at the frequency $f_4$. The slope $S_3$ is calculated based on the FM modulation index $\Delta f$ and the amplitude $\Delta P_3$, and the slope $S_4$ is calculated based on the FM modulation index $\Delta f$ and the amplitude $\Delta P_4$. Then, $P_3$, $S_3$, $P_4$, and $S_4$ are put into the above-described formula (4) and thereby parameters $a_3$, $b_3$, $c_3$, and $d_3$ are calculated. Specifically, the transmission characteristics P(f) to be expressed in formula (5) are obtained.

$$P(f)=a_3 f^3 + b_3 f^2 + c_3 f + d_3 \qquad (5)$$

Note that formula (5) expresses the transmission characteristics of the optical transmission path in the frequency range between $f_3$ and $f_4$.

Accordingly, in order to monitor the pass-band shape, the center frequency of the probe signal is swept, and the average power P and the amplitude $\Delta P$ (namely, the slope S) are measured at each of the plurality of measurement points. In the example illustrated in FIG. 4, for example, when measurement results in the frequency range between $f_1$ and $f_2$ are used, the transmission characteristics in the frequency range between $f_1$ and $f_2$ are calculated. Further, when the measurement results in the frequency range between $f_2$ and $f_3$ are used, the transmission characteristics in the frequency range between $f_2$ and $f_3$ are calculated.

As described above, the transmission characteristics monitoring system measures the average power P and the slope S at each of a plurality of the measurement points. Then, the transmission characteristics monitoring device 30 specifies transmission characteristics of an optical transmission path based on a plurality of the measurement results.

However, when the optical amplifier (for example, an EDFA) is arranged in the optical transmission path to be monitored, the transmission characteristics of the optical transmission path may fail to be monitored accurately. In an example illustrated in FIG. 5A, for example, relay nodes 101 and 102 are provided between the probe signal transmitter 20 and the transmission characteristics monitoring device 30. In each of the relay nodes 101 and 102, the optical amplifier is implemented. Accordingly, the probe signal transmitted from the probe signal transmitter 20 is amplified in each of the relay nodes 101 and 102. At this time, ASE noise is generated in the relay nodes 101 and 102. Therefore, as illustrated in FIG. 5B, the transmission characteristics monitoring device 30 receives not only the probe signal but also the ASE noise.

Figure 6:
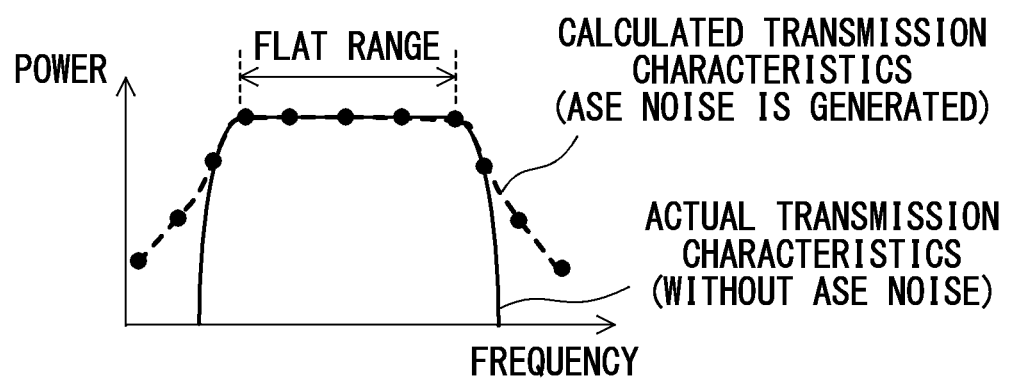
FIG. 6 illustrates problematic points due to ASE noise.

FIG. 6 illustrates problematic points due to ASE noise. In FIG. 6, a solid line indicates actual transmission characteristics of the optical transmission path. That is, the solid line indicates the transmission characteristics of the optical transmission path at the time when ASE noise is assumed to be not generated. Each black circle symbol indicates a received optical power measured using the transmission characteristics monitoring device 30. Nota that, as illustrated in FIG. 6, the transmission characteristics monitoring device 30 measures the received optical power at a plurality of measurement points.

Figure 5B:
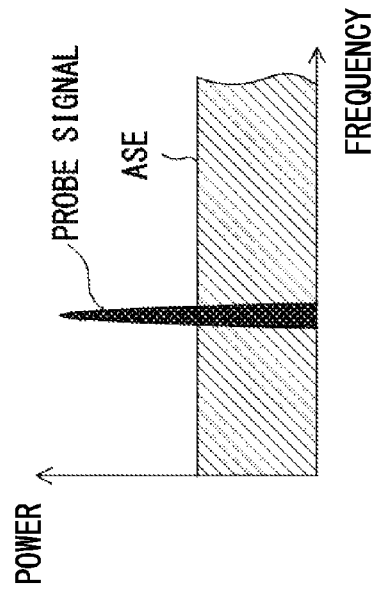
FIGS. 5A and 5B illustrate generation of ASE noise.
Figure 5A:
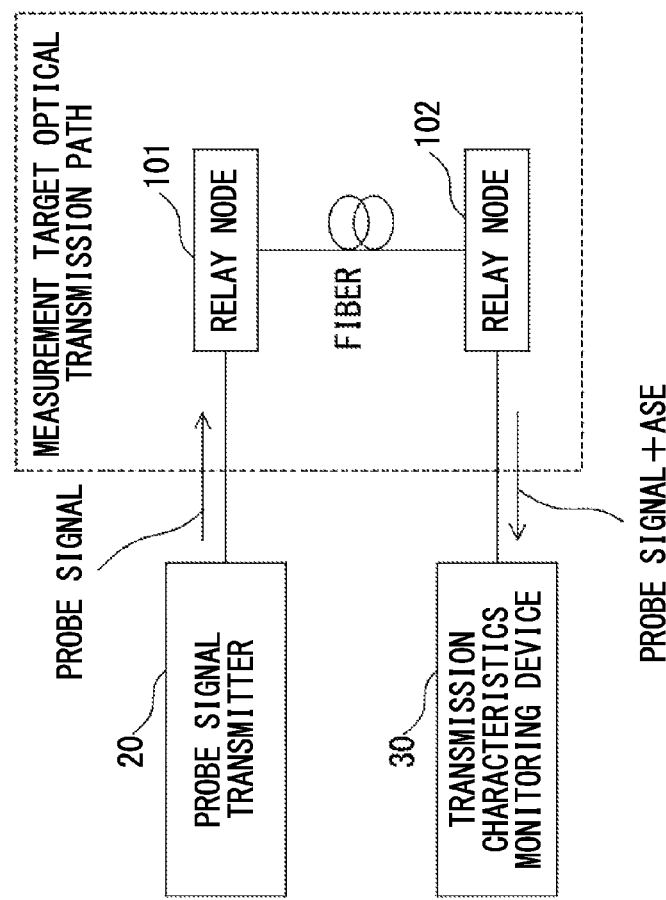

As illustrated in FIG. 5B, the power of the probe signal is sufficiently great as compared to a power of the ASE noise. Therefore, in the frequency range (the frequency range between $f_2$ and $f_3$ in the example illustrated in FIG. 4) in which the transmission characteristics of the optical transmission path are flat, the ASE noise power is negligible with respect to the received power of the probe signal. On the other hand, in the frequency range (the frequencies of $f_1$ and $f_4$ in the example illustrated in FIG. 4) in which the transmission characteristics have a slope, the received power of the probe signal is reduced, and therefore the ASE noise power is not negligible. Specifically, in the frequency range in which the transmission characteristics have a slope, an influence of the ASE noise power becomes great with respect to the power measurement value of received light and an accuracy of the measurement results in the received power of the probe signal becomes low. Accordingly, in the frequency range in which the transmission characteristics have a slope, when the transmission characteristics of the optical transmission path are calculated using the above-described formulas (1) to (5), monitoring accuracy may be reduced.

Note that a broken line illustrated in FIG. 6 indicates the transmission characteristics calculated based on the measurement value of the received power when the ASE noise is generated. As described above, when the ASE noise is generated in the optical transmission path, the monitoring accuracy of the transmission characteristics is reduced.

Embodiment

FIG. 7 illustrates an example of the transmission characteristics monitoring system according to an embodiment of the present invention. As illustrated in FIG. 7, the transmission characteristics monitoring system includes the probe signal transmitter 20 and the transmission characteristics monitoring device 30. The probe signal transmitter 20 and the transmission characteristics monitoring device 30 are implemented in the nodes at both ends of an optical transmission path to be monitored.

The probe signal transmitter 20 includes a frequency controller 21, a CW light source 22, a frequency modulator 23, and a polarization modulator 24. The frequency controller 21 controls an oscillating frequency of the CW light source 22 in accordance with a frequency instruction given from the transmission characteristics monitoring device 30. The CW light source 22 generates CW light in accordance with a control by the frequency controller 21. Specifically, the CW light source 22 generates CW light of an optical frequency instructed by the frequency controller 21. The frequency modulator 23 modulates the CW light output from the CW light source 22 in accordance with the specified FM modulation index $\Delta f$ to generate a frequency modulated optical signal. In the transmission characteristics monitoring system, this frequency modulated optical signal is used as the probe signal for monitoring the transmission characteristics of an optical transmission path.

The polarization modulator 24 gives a polarization scramble to the probe signal (specifically, the frequency modulated optical signal generated by the frequency modulator 23). When the polarization scramble is given to the probe signal, an influence of nonlinear effects is suppressed in monitoring the transmission characteristics. Note that the polarization modulator 24 is not an essential component in the transmission characteristics monitoring system.

The probe signal generated by the probe signal transmitter 20 is transmitted through the optical transmission path to be monitored. One or a plurality of relay nodes are provided in the optical transmission path. The optical amplifier is implemented in each relay node. When the optical frequency of the CW light is $f_c$, the optical frequency of the probe signal varies between $f_c - \Delta f/2$ and $f_c + \Delta f/2$. It is assumed that the optical power of the probe signal output from the probe signal transmitter 20 is kept constant.

The ROADM to which the transmission characteristics monitoring device 30 is connected drops a target wavelength channel from a received WDM optical signal and guides the dropped optical signal to the transmission characteristics monitoring device 30. Note that the probe signal is assumed to be transmitted through this target wavelength channel. Thus, the transmission characteristics monitoring device 30 receives the wavelength channel including the probe signal.

The transmission characteristics monitoring device 30 includes an optical bandpass filter (OBPF) 31, a photo detector (PD) 32, an analog-to-digital converter (ADC) 33, a power detector 34, a slope detector 35, an analyzer 36, and a frequency instruction unit 37. The OBPF 31 eliminates an unnecessary optical frequency component. Note that the OBPF 31 is not an essential component in the transmission characteristics monitoring system.

The PD 32 converts input light into an electric signal. Specifically, the PD 32 converts the probe signal received from the probe signal transmitter 20 into an electric signal. Note that ASE noise is generated due to the optical amplifiers implemented in the optical transmission path. Thus the input light at the transmission characteristics monitoring device 30 includes the probe signal and the ASE noise. Accordingly, an output signal of the PD 32 includes an ASE noise component. The ADC 33 converts the output signal of the PD 32 into a digital signal. This digital signal indicates received light including the probe signal and the ASE noise.

The power detector 34 detects an average power of the received light based on the digital signal output from the ADC 33. The slope detector 35 detects an amplitude of the power variation of the received light based on the digital signal output from the ADC 33 and calculates a slope of the transmission characteristics based on the amplitude. The analyzer 36 calculates the transmission characteristics of the optical transmission path based on the average power of the received light detected by the power detector 34 and the slope of the transmission characteristics detected by the slope detector 35. The frequency instruction unit 37 generates the frequency instruction according to analysis results of the analyzer 36. This frequency instruction is given to the frequency controller 21 of the probe signal transmitter 20.

FIG. 8 is a flowchart illustrating an example of operations of the probe signal transmitter 20. When the processes in this flowchart are executed, information is given to the probe signal transmitter 20 for specifying the wavelength channel (hereinafter referred to as a target wavelength channel) in which the transmission characteristics ought to be monitored. The center wavelength of the pass band of the target wavelength channel is assumed to be known.

Figure 9:
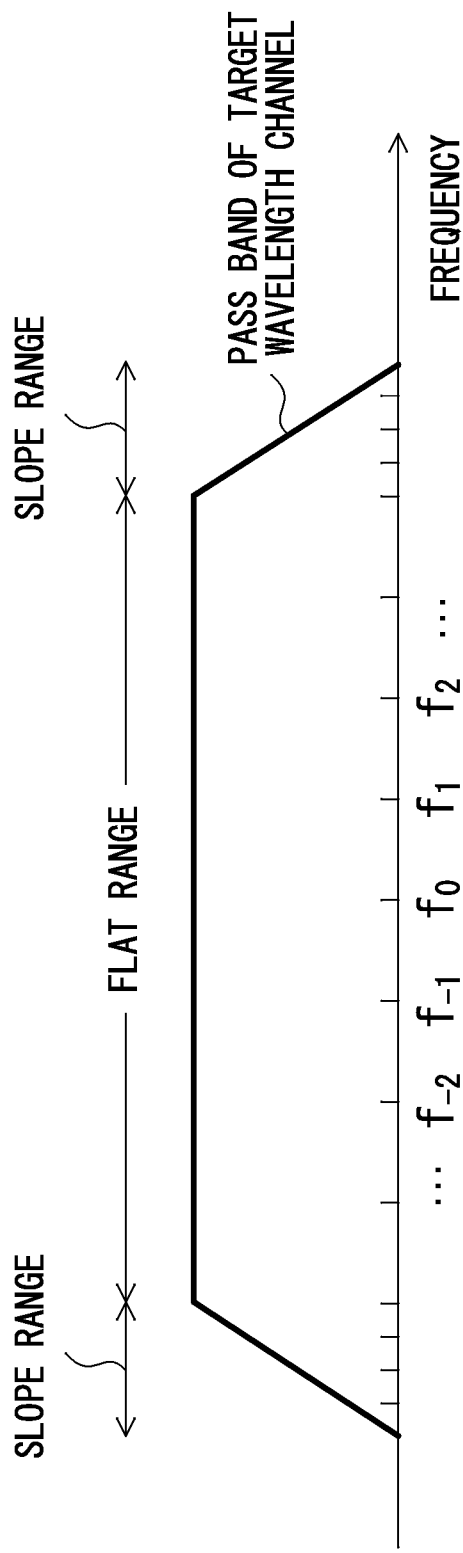
FIG. 9 illustrates an example of a pass band for a target wavelength channel.

In S1, the frequency controller 21 sets a default frequency corresponding to the specified target wavelength channel to the CW light source 22. In this example, as illustrated in FIG. 9, an optical frequency corresponding to the center wavelength of the pass band of the target wavelength channel is $f_0$. Accordingly, the CW light source 22 outputs the CW light of the optical frequency $f_0$.

In S2, the frequency modulator 23 modulates the CW light output from the CW light source 22 according to the FM modulation index $\Delta f$ so as to generate the probe signal. The center frequency of the probe signal is $f_0$. Then, the probe signal transmitter 20 transmits the probe signal through an optical transmission path to be monitored. The probe signal is transmitted through the target wavelength channel.

In S3 and S4, the probe signal transmitter 20 awaits the frequency instruction. When the frequency instruction is received from the transmission characteristics monitoring device 30, the frequency controller 21 controls the oscillating frequency of the CW light source 22 in accordance with the frequency instruction. For example, the frequency instruction indicates a change amount of the optical frequency. For example, when the current frequency of the CW light is $f_0$ and the frequency instruction indicates +4 GHz, the frequency controller 21 controls the oscillating frequency of the CW light source 22 to $f_0$+4 GHz. Then, the process in the probe signal transmitter 20 returns to S2.

When the processes in S2-S4 are repeatedly executed, the center frequency of the probe signal changes at a specified spacing. In the example illustrated in FIG. 9, for example, when the transmission characteristics monitoring system monitors the transmission characteristics on the high-frequency side with respect to a center of the target wavelength channel, the center frequency of the probe signal increases in the order of $f_0$, $f_1$, $f_2$ . . . On the other hand, when the transmission characteristics monitoring system monitors the transmission characteristics on the low-frequency side with respect to the center of the target wavelength channel, the center frequency of the probe signal decreases from $f_0$.

Note that the shift amount of the center frequency of the probe signal in the frequency range in which the transmission characteristics have a slope may be made smaller than the shift amount of the center frequency of the probe signal in the frequency range in which the transmission characteristics are flat. For example, in the frequency range in which the transmission characteristics are flat, the center frequency of the probe signal is shifted at the spacing of 4 GHz, and in the frequency range in which the transmission characteristics have a slope, the center frequency of the probe signal is shifted at the spacing of 1 GHz.

Figure 10:
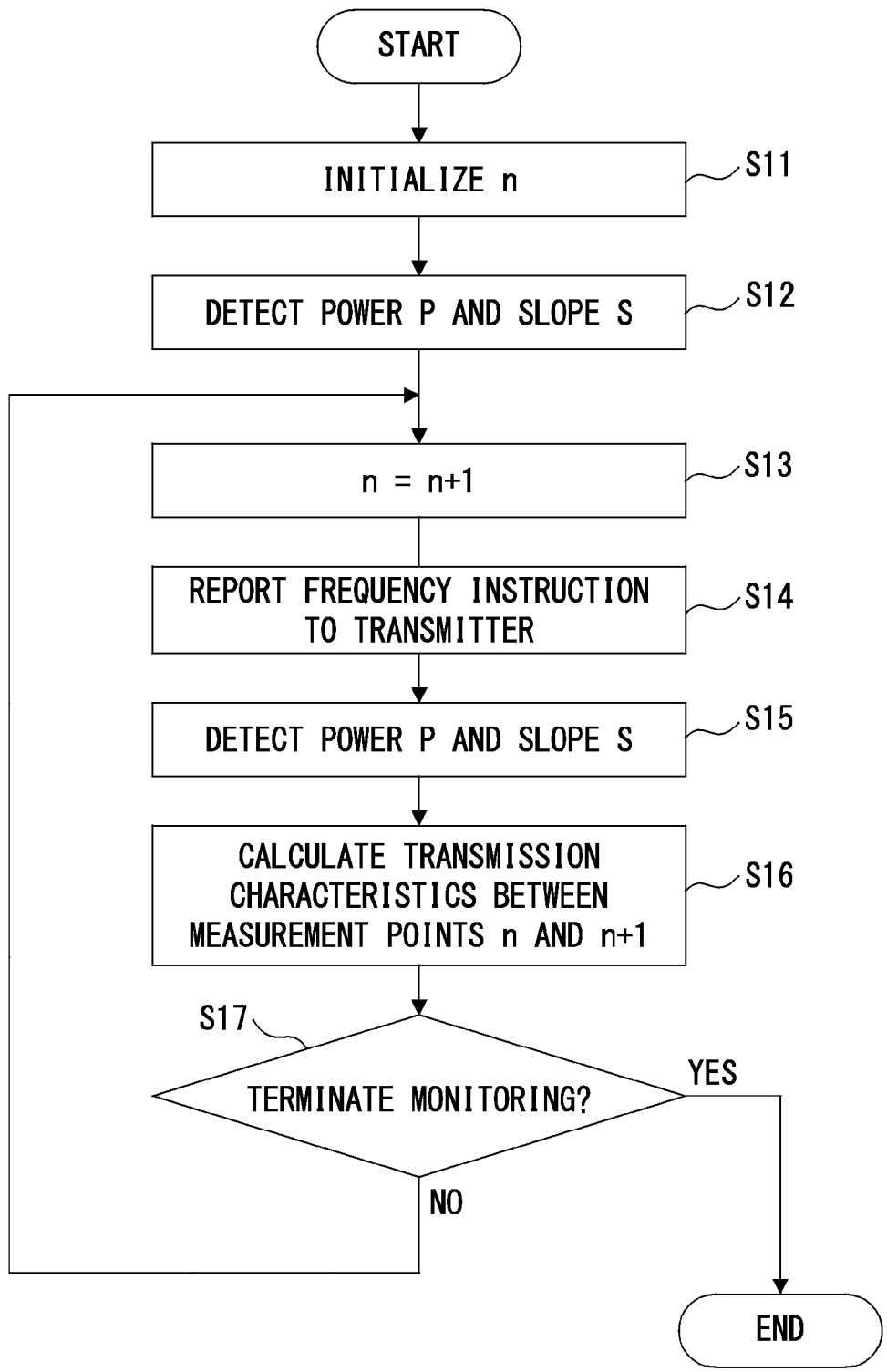
FIG. 10 is a flowchart illustrating an example of operations of a transmission characteristics monitoring device.

FIG. 10 is a flowchart illustrating an example of operations of the transmission characteristics monitoring device 30. Here, the probe signal transmitted from the probe signal transmitter 20 is guided to the transmission characteristics monitoring device 30.

In S11, the analyzer 36 initializes a variable n. The variable n identifies the measurement point. The initial measurement point indicates a center frequency of the probe signal. In this example, an initial value of the variable n is zero. In the example illustrated in FIG. 9, n=zero indicates the frequency $f_0$. In the following descriptions, the transmission characteristics monitoring device 30 is assumed to monitor the transmission characteristics on the high-frequency side with respect to the center of the target wavelength channel.

In S12, the power detector 34 detects the average power of the received light at the measurement point n. Here, the received light includes the probe signal of the center frequency $f_n$. Further, the slope detector 35 detects an amplitude of the power variation of the received light at the measurement point n and calculates a slope of the transmission characteristics at the measurement point n from the detected amplitude. The slope of the transmission characteristics is calculated by dividing the amplitude of the power variation of the received light by the FM modulation index $\Delta f$. Hereinafter, the average power and the slope at the measurement point n may be described as $P_n$ and $S_n$, respectively.

In S13, the analyzer 36 increments the variable n by one. Here, the variable n+1 specifies the measurement point n+1. Specifically, the variable n+1 indicates a frequency $f_{n+1}$. In S14, the frequency instruction unit 37 generates the frequency instruction and reports the generated frequency instruction to the probe signal transmitter 20. In this example, the frequency instruction indicates the shift amount of the center frequency of the probe signal. Specifically, the frequency instruction specifies a frequency spacing between the measurement points. As described above, the shift amount (or the frequency spacing between the measurement points) for the frequency range in which the transmission characteristics are flat may be different from that for the frequency range in which the transmission characteristics have a slope.

The probe signal transmitter 20 controls the frequency of the CW light to $f_{n+1}$ in accordance with the frequency instruction. Accordingly, the center frequency of the probe signal transmitted from the probe signal transmitter 20 is $f_{n+1}$. That is to say, the received light of the transmission characteristics monitoring device 30 includes the probe signal of the center frequency $f_{n+1}$.

In S15, the power detector 34 detects the average power of the received light at the measurement point n+1. At this time, the received light includes the probe signal of the center frequency $f_{n+1}$. Further, the slope detector 35 detects the slope of the transmission characteristics at the measurement point n+1. Hereinafter, the average power and the slope at the measurement point n+1 may be described as $P_{n+1}$ and $S_{n+1}$, respectively.

In S16, the analyzer 36 calculates the transmission characteristics of the optical transmission path between the measurement points n and n+1 based on the average power $P_n$ and $P_{n+1}$ and the slope $S_n$ and $S_{n+1}$. Specifically, the transmission characteristics of the optical transmission path in the frequency range between $f_n$ and $f_{n+1}$ are calculated. A method for calculating the transmission characteristics will be described below.

In S17, the analyzer 36 determines whether to terminate monitoring of the transmission characteristics. For example, when the variable n has reached a specified value, the analyzer 36 may terminate the monitoring of the transmission characteristics. Alternatively, when the center frequency of the probe signal has reached a specified frequency, the analyzer 36 may terminate the monitoring of the transmission characteristics. In this case, the specified frequency may be determined based on a width of the pass band of the target wavelength channel.

When the monitoring of the transmission characteristics is not terminated, the process in the transmission characteristics monitoring device 30 returns to S13. That is, the processes in S13-S16 are repeatedly executed. Here the transmission characteristics between the measurement points n and n+1 are calculated in S16. Accordingly, when the processes in S13-S16 are repeatedly executed while incrementing the variable n, the transmission characteristics of the entire pass band are calculated. Note that, when the transmission characteristics on the low-frequency side are monitored with respect to the center of the target wavelength channel, the variable n is decremented by one in S13.

As described above, the analyzer 36 repeatedly executes the processes in S13-S16 so as to calculate the transmission characteristics between the measurement points n and n+1. The transmission characteristics are calculated, for example, by using the above-described formulas (1) to (5). In this case, $P_n$, $P_{n+1}$, $S_n$, and $S_{n+1}$ are put into formula (4), and thereby the parameters $a_n$, $b_n$, $c_n$, and $d_n$ are determined. As a result, a polynomial that expresses the transmission characteristics of the optical transmission path in the frequency range between $f_n$ and $f_{n+1}$ is obtained.

However, as described above with reference to FIG. 6, when ASE noise is generated in the optical transmission path, the accuracy of the transmission characteristics calculated using formulas (1) to (5) maybe low. That is, in the frequency range in which the transmission characteristics have a slope, the received optical power of the probe signal becomes low in the transmission characteristics monitoring device 30, and therefore an influence of the ASE noise is easy to receive in the measurement values of the received optical power. In this case, the transmission characteristics calculated based on the measurement values of the received optical power become higher than actual transmission characteristics.

Note that the power of the ASE noise is approximately constant with respect to the frequency. Accordingly, the amplitude of the power variation of the received light scarcely depends on the presence or absence of the ASE noise. In examples illustrated in FIGS. 11A and 11B, for example, the center frequency of the probe signal is $f_n$ and the FM frequency index is Δf. In addition, as illustrated in FIG. 11A, the average power (namely, the average power of the probe signal)) of the received light is $P_0$ at the time when the ASE noise is not generated. Further, the power of the received light varies in the range between $P_x$ and $P_y$. Specifically, the amplitude of the power variation of the received light is ΔP.

When the ASE noise is generated, the power of the received light becomes greater by the ASE noise as compared to a case in which the ASE noise is not generated. Therefore, as illustrated in FIG. 11B, the power of the received light varies in the range between $P_x$+ASE and $P_y$+ASE. Specifically, even when the ASE noise is generated, the amplitude of the power variation of the received light is ΔP.

As described, above, the amplitude of the power variation of the received light scarcely depends on the presence or absence of the ASE noise. Specifically, the slope of the transmission characteristics scarcely depends on the presence or absence of the ASE noise. Accordingly, in the frequency range in which the transmission characteristics have a slope, the power measurement value of the received light is corrected using the slope of the transmission characteristics when necessary, and thereby the transmission characteristics are calculated.

EXAMPLE

FIGS. 12A and 12B illustrate a method for calculating a slope of the transmission characteristics. Here, as illustrated in FIG. 12A, an average power of the received light is assumed to be measured at each measurement point. Further, the following descriptions are used below.

$P_0$: the maximum value of the power measurement values obtained at respective measurement points $P_1$ to $P_N$: the power measurement values obtained at respective measurement points 1 to N $S(f_0)$ to $S(f_N)$: the slope measurement values of the transmission characteristics obtained at respective measurement points 1 to N Note that the slope measurement value is calculated by dividing the measurement value of the amplitude of the power variation by the FM modulation index Δf.

Here, the slope of the transmission characteristics is assumed to be approximated using a 2nd-order polynomial. Specifically, the slope of the transmission characteristics is assumed to be expressed using the following slope approximate formula.

$$S(f)=xf^2+yf+z \quad (6)$$

In this case, when three slope measurement values are put into the slope approximate formula, parameters x, y, and z are calculated. Specifically, in order that the slope approximate formula may be determined in the frequency range in the vicinity of the measurement point n, for example, the slope measurement values $S(f_{n-1})$, $S(f_n)$, and $S(f_{n+1})$ that are obtained at measurement points n−1, n, and n+1, respectively, are put into the slope approximate formulas, and thereby the parameters x, y, and z corresponding to the measurement point n are determined. As a result, the slope function that indicates the slope of the transmission characteristics in the vicinity of the measurement point n is generated.

FIG. 12B illustrates an example of the slope function S(f) obtained based on the slope measurement values. In the frequency range (for example, in the frequency range between $f_2$ and $f_N$) in which the transmission characteristics decrease with respect to the frequency, the slope function S(f) represents a negative value as illustrated in FIG. 12B. On the other hand, in the frequency range in which the transmission characteristics increase with respect to the frequency, the slope function S(f) represents a positive value. Note that the slope function may be generated using other methods. For example, the above-described formula (3) also expresses the slope of the transmission characteristics.

FIG. 13 illustrates a correction of the transmission characteristics. Here, the average power of the received light and the slope of the transmission characteristics are measured at respective measurement points. For example, the power measurement values $P_n$, $P_{n+1}$, and $P_{n+2}$ are obtained with respect to center frequencies $f_n$, $f_{n+1}$, and $f_{n+2}$ of the probe light. Further, the slope function expressed using formula (6) is assumed to be obtained based on the slope measurement values detected at respective measurement points.

When the transmission characteristics in the frequency range between $f_n$ and $f_{n+1}$ are calculated, a corrected power value $Q_{n+1}$ is calculated first using the following formula based on the power measurement value $P_n$ at the measurement point n and the slope function S(f) for the frequency range between $f_n$ and $f_{n+1}$.

$$Q_{n+1}=P_n+\Sigma S(f)df$$

Σ represents an integral operation. Specifically, ΣS(f)df indicates an integral of the slope function. When the transmission characteristics in the frequency range between $f_n$ and $f_{n+1}$ are calculated, an integral range is also between $f_n$ and $f_{n+1}$.

Then, it is determined whether the power measurement value $P_{n+1}$ and the corrected power value $Q_{n+1}$ satisfy the following conditions.

$$P_{n+1}>Q_{n+1}(=P_n+\Sigma S(f)df)$$

$$P_{n+1}-Q_{n+1}>TH$$

When the power measurement value $P_{n+1}$ is greater than the corrected power value $Q_{n+1}$ and a difference D between them is greater than a specified threshold TH, it is determined that reliability of the power measurement value $P_{n+1}$ is low due to the influence of ASE noise. In this case, the transmission characteristics in the frequency range between $f_n$ and $f_{n+1}$ are calculated not using the power measurement value $P_{n+1}$ but using the corrected power value $Q_{n+1}$. As one example, a fitting curve is obtained with respect to the power measurement value $P_n$ at the frequency $f_n$ and the corrected power value $Q_{n+1}$ at the frequency $f_{n+1}$, and thereby the transmission characteristics in the frequency range between $f_n$ and $f_{n+1}$ may be calculated. Alternatively, the power measurement value $P_n$ and the slope $S_n$ at the frequency $f_n$ and the corrected power value $Q_{n+1}$ and the slope $S_{n+1}$ at the frequency $f_{n+1}$ are put into the above-described formula (4), and thereby the transmission characteristics in the frequency range between $f_n$ and $f_{n+1}$ may be calculated.

When the transmission characteristics are calculated using the corrected power value Q at a certain measurement point in place of the power measurement value P, the next corrected power value is calculated based on the calculated corrected power value. In the example illustrated in FIG. 13, when the difference D between the power measurement value $P_{n+1}$ and the corrected power value $Q_{n+1}$ is greater than the specified threshold TH, the transmission characteristics in the frequency range between $f_n$ and $f_{n+1}$ are calculated using the corrected power value $Q_{n+1}$ in place of the power measurement value $P_{n+1}$. In this case, the corrected power value $Q_{n+2}$ is generated based on the corrected power value $Q_{n+1}$. Specifically, the slope function for the frequency range between $f_{n+1}$ and $f_{n+2}$ is generated. Then the corrected power value $Q_{n+2}$ is calculated using the following formula based on the corrected power value $Q_{n+1}$ and the slope function S(f) for the frequency range between $f_{n+1}$ and $f_{n+2}$.

$$Q_{n+2}=Q_{n+1}+\Sigma S(f)df$$

An integral range is between $f_{n+1}$ and $f_{n+2}$. Further, the transmission characteristics in the frequency range between $f_{n+1}$ and $f_{n+2}$ are calculated based on the corrected power value $Q_{n+1}$ at the frequency $f_{n+1}$ and the corrected power value $Q_{n+2}$ at the frequency $f_{n+2}$.

In the procedure for monitoring the transmission characteristics, the center frequency of the probe signal is shifted from the center to the end in the pass band of the target channel. In the example illustrated in FIG. 9, when the pass-band shape on the high-frequency side is monitored, the center frequency of the probe signal is shifted from the frequency $f_0$ to the high-frequency side. ΣS(f) df is calculated by integrating the slope function in the high-frequency direction. Here, in the slope range on the high-frequency side, the slope function S(f) includes negative values. Thus, the integral value of the slope function S(f) is negative. Accordingly, in the slope range on the high-frequency side, the corrected power value Q is smaller than the power measurement value P.

On the other hand, when the pass-band shape on the low-frequency side is monitored, the center frequency of the probe signal is shifted from the frequency $f_0$ to the low-frequency side. ΣS(f)df is calculated by integrating the slope function in the low-frequency direction. Here, in the slope range on the low-frequency side, the slope function S(f) includes positive values. Thus, also in this case, the integral value of the slope function S(f) is negative. Accordingly, also in the slope range on the low-frequency side, the corrected power value Q is smaller than the power measurement value P.

In the slope range of the transmission characteristics, the difference between the power measurement value P and the corrected power value Q is considered to be noise component. Thus, according to the monitoring method of the embodiment of the present invention, an influence of the noise component is suppressed and the pass-band shape is calculated accurately.

Figure 14:
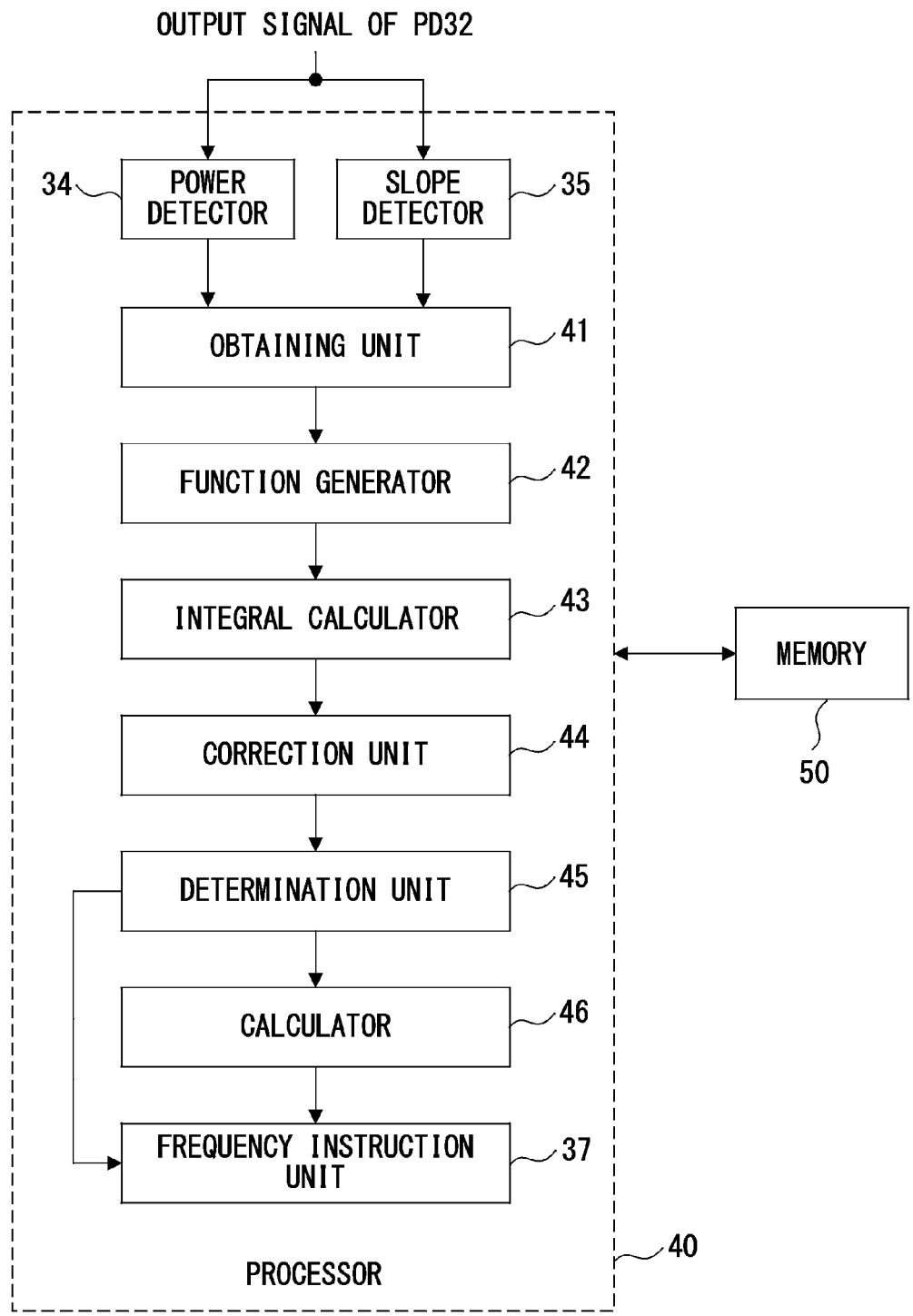
FIG. 14 illustrates functions of the transmission characteristics monitoring device.

FIG. 14 illustrates functions of the transmission characteristics monitoring device 30. The transmission characteristics monitoring device 30 includes the power detector 34, the slope detector 35, an obtaining unit 41, a function generator 42, an integral calculator 43, a correction unit 44, a determination unit 45, a calculator 46, and the frequency instruction unit 37. In FIG. 14, the OBPF 31, the PD 32, and the ADC 33 illustrated in FIG. 7 are omitted. The obtaining unit 41, the function generator 42, the integral calculator 43, the correction unit 44, the determination unit 45, and the calculator 46 correspond to the analyzer 36 illustrated in FIG. 7. The transmission characteristics monitoring device 30 may include other functions not illustrated in FIG. 14.

The power detector 34, the slope detector 35, the obtaining unit 41, the function generator 42, the integral calculator 43, the correction unit 44, the determination unit 45, the calculator 46, and the frequency instruction unit 37 are realized by executing given software programs using a processor 40. The processor 40 can use a memory 50 that is implemented in the transmission characteristics monitoring device 30. Further, a portion of the functions of the power detector 34, the slope detector 35, the obtaining unit 41, the function generator 42, the integral calculator 43, the correction unit 44, the determination unit 45, the calculator 46, and the frequency instruction unit 37 maybe realized using hardware circuits.

An electric signal output from the PD 32 is digitized and given to the power detector 34 and the slope detector 35. Note that the PD 32 converts the received light of the transmission characteristics monitoring device 30 into an electric signal. As described above, the received light includes the probe signal generated by the probe signal transmitter 20.

The power detector 34 detects an average power of the received light based on the electric signal indicating the received light. The slope detector 35 detects an amplitude of the power variation of the received light based on the electric signal indicating the received light, and detects a slope of the transmission characteristics with respect to the frequency based on the detected amplitude. The slope value is calculated by dividing the amplitude of the power variation by the FM modulation index $\Delta f$.

The obtaining unit 41 obtains the power measurement value $P_n$ indicating the average power detected by the power detector 34 when the center frequency of the probe signal is $f_n$, the slope value $S_n$ indicating the slope detected by the slope detector 35 when the center frequency of the probe signal is $f_n$, the power measurement value $P_{n+1}$ indicating the average power detected by the power detector 34 when the center frequency of the probe signal is $f_{n+1}$, and the slope value $S_{n+1}$ indicating the slope detected by the slope detector 35 when the center frequency of the probe signal is $f_{n+1}$.

The function generator 42 generates the slope function S(f) indicating the slope of the transmission characteristics with respect to the frequency for the frequency range between $f_n$ and $f_{n+1}$ based on the slope values $S_n$ and $S_{n+1}$. In the case of using the above-described formula (6), the function generator 42 may generate the slope function S(f) for the frequency range between $f_n$ and $f_{n+1}$ based on the slope values (for example, $S_{n-1}$, $S_n$, and $S_{n+1}$) detected at three measurement points including the measurement points n and n+1.

The integral calculator 43 calculates an integral of the slope function S(f) for the frequency range between $f_n$ and $f_{n+1}$. The correction unit 44 adds an integral of the slope function S(f) to the power measurement value $P_n$ detected at the measurement point n so as to generate the corrected power value $Q_{n+1}$. The determination unit 45 determines whether the difference between the power measurement value $P_{n+1}$ detected at the measurement point n+1 and the corrected power value $Q_{n+1}$ is greater than the specified threshold.

If the difference is smaller than or equal to the specified threshold, the calculator 46 determines that an influence of ASE noise is small as compared to the power measurement value $P_{n+1}$ detected at the measurement point n+1. In this case, the calculator 46 calculates the transmission characteristics at the frequency $f_{n+1}$ using the power measurement value $P_{n+1}$. For example, the power measurement values $P_n$ and $P_{n+1}$ and the slope values $S_n$ and $S_{n+1}$ are put into the above-described formulas (1) to (5), and thereby the transmission characteristics in the frequency range between $f_n$ and $f_{n+1}$ are calculated.

On the other hand, if the above-described difference is greater than the specified threshold, the calculator 46 determines that an influence of ASE noise is great as compared to the power measurement value $P_{n+1}$ detected at the measurement point n+1. In this case, the calculator 46 calculates the transmission characteristics at the frequency $f_{n+1}$ using the corrected power value $Q_{n+1}$ in place of the power measurement value $P_{n+1}$. For example, the calculator 46 adds the integral value $\Sigma S(f)df$ to the power measurement value $P_n$ detected at the measurement point n so as to calculate the transmission characteristics in the frequency range between $f_n$ and $f_{n+1}$. In this case, the calculator 46 may divide the frequency range between $f_n$ and $f_{n+1}$ into a plurality of small frequency ranges, and integrate the slope function S(f) for each of the small frequency ranges to obtain the transmission characteristics. Alternatively, the calculator 46 may give the power measurement value $P_n$, the corrected power value $Q_{n+1}$, and the slope values $S_n$ and $S_{n+1}$ to the above-described formulas (1) to (5), and thereby calculate the transmission characteristics in the frequency range between $f_n$ and $f_{n+1}$.

The frequency instruction unit 37 generates the frequency instruction for specifying the next measurement point and reports the generated frequency instruction to the probe signal transmitter 20. In this example, the frequency instruction indicates the shift amount of the center frequency of the probe signal. The frequency shift amount $f_{shift1}$ may be constant. Note that after it is determined that a difference between the power measurement value $P_{n+1}$ and the corrected power value $Q_{n+1}$ is greater than the threshold, the frequency instruction unit 37 may report the frequency shift amount $f_{shift2}$, which is smaller than the frequency shift amount $f_{shift1}$, to the probe signal transmitter 20. By doing this, the probe signal transmitter 20 shifts the center frequency of the probe signal using the frequency shift amount $f_{shift2}$. Note that the frequency instruction unit 37 may report the frequency shift amount $f_{shift2}$ to the probe signal transmitter 20, when the slope $S_{n+1}$ detected at the measurement point n+1 is greater than the specified slope threshold.

Figure 15:
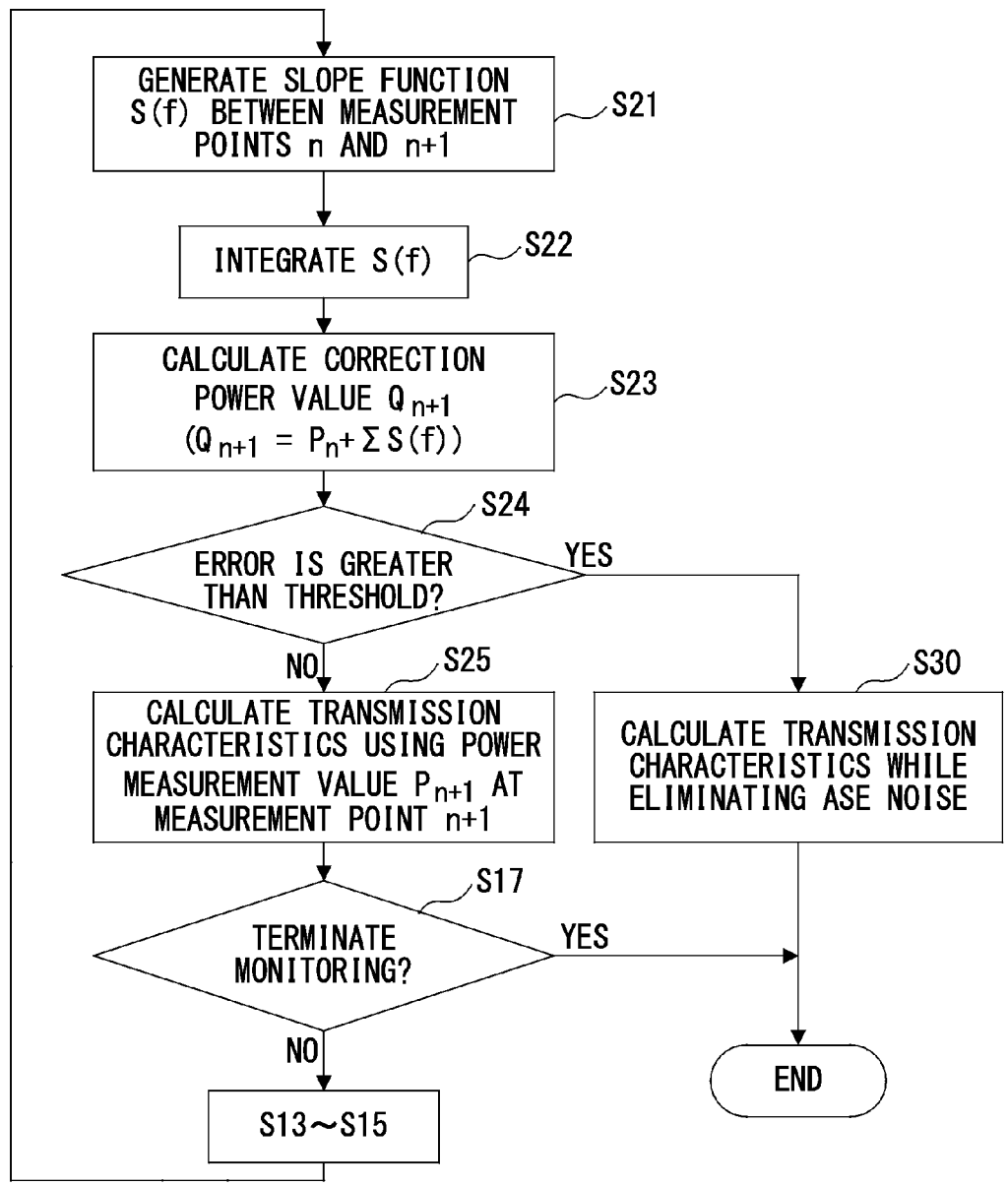
FIG. 15 is a flowchart illustrating an example of the process of calculating the transmission characteristics at each measurement point.

FIG. 15 is a flowchart illustrating an example of the process of calculating the transmission characteristics at each measurement point. The processes in this flowchart correspond to those in S13-S17 of FIG. 10. Further, the processes in this flowchart are executed individually from the center frequency of the target wavelength channel to the high-frequency side and the low-frequency side. When the processes in this flowchart are executed, the processor 40 is assumed to obtain the power measurement values $P_n$ and $P_{n+1}$ and the slope values $S_n$ and $S_{n+1}$.

The processor 40 executes the processes in S21-S25 at each measurement point. At this time, each measurement point is shifted using the specified frequency interval $f_{shift1}$.

In S21, the function generator 42 generates the slope function S(f) representing a slope of the transmission characteristics for the frequency range between $f_n$ and $f_{n+1}$. In S22, the integral calculator 43 calculates an integral of the slope function S(f) for the frequency range between $f_n$ and $f_{n+1}$. In S23, the correction unit 44 adds the integral of the slope function S(f) to the power measurement value $P_n$ so as to generate the corrected power value $Q_{n+1}$. In S24, the determination unit 45 determines whether the difference between the power measurement value $P_{n+1}$ and the corrected power value $Q_{n+1}$ is greater than the specified threshold.

If the difference is smaller than or equal to the specified threshold, the calculator 46 calculates the transmission characteristics at the frequency $f_{n+1}$ using the power measurement value $P_{n+1}$ in S25. In the frequency range in which the transmission characteristics of the optical transmission path are flat, the optical power of the probe signal is great and an influence of ASE noise is small. In this case, since it is determined that the difference between the power measurement value $P_{n+1}$ and the corrected power value $Q_{n+1}$ is smaller than the specified threshold, the process in S25 is executed at each measurement point.

On the other hand, when the difference between the power measurement value $P_{n+1}$ and the corrected power value $Q_{n+1}$ is greater than the specified threshold (Yes in S24), the calculator 46 executes the process in S30. In S30, the transmission characteristics of the optical transmission path are calculated while eliminating an influence of the ASE noise.

FIG. 16 is a flowchart illustrating an example of the process in which the transmission characteristics of the optical transmission path are calculated while eliminating an influence of ASE noise. The processes in the flowchart illustrated in FIG. 16 correspond to that in S30 of FIG. 15.

In S31, the calculator 46 calculates the transmission characteristics at the frequency $f_{n+1}$ using the power measurement value $P_n$ and the slope function S(f). When the process in S31 is executed in the first turn, the power measurement value $P_n$ is a power measurement value at the measurement point n. Then the calculator 46 adds an integral of the slope function S(f) to the power measurement value $P_n$ and thereby calculates the corrected power value $Q^{n+1}$ at the frequency $f_{n+1}$. As one example, the corrected power value $Q_{n+1}$ indicates the transmission characteristics at the frequency $f_{n+1}$.

In S32, the processor 40 determines whether to terminate the monitoring of the transmission characteristics. For example, when the variable n has reached a specified value, the processor 40 may terminate the monitoring of the transmission characteristics. Alternatively, when the center frequency of the probe signal has reached the specified frequency, the processor 40 may terminate the monitoring of the transmission characteristics.

In S33, the calculator 46 sets the corrected power value $Q_{n+1}$ as the power measurement value $P_n$ for calculating the transmission characteristics at the next measurement point. In S34, the processor 40 increments the variable n and selects the next measurement point. In S35, the frequency instruction unit 37 generates the frequency instruction and reports the generated frequency instruction to the probe signal transmitter 20. The frequency shift amount $f_{shift2}$ is smaller than the frequency shift amount $f_{shift1}$ that is used in the processes in S21-S25. Thus, as compared to the time when the processes in S21-S25 are executed, when the processes in S31-S37 are executed, the transmission characteristics are monitored at fine frequency spacing. Accordingly, accuracy of the monitoring of the transmission characteristics is improved.

In S36, the slope detector 35 detects the slope value of the transmission characteristics at a new measurement point. In S37, the slope function S(f) is generated based on the slope value at a previous measurement point and the slope value at the new measurement point. Then, the process in the processor 40 returns to S31. Specifically, the processes in S31-S37 are repeatedly executed.

Assume, for example, that when the transmission characteristics are calculated based on the measurement results at the measurement points n and n+1, it is determined that the difference between the power measurement value $P_{n+1}$ and the corrected power value $Q_{n+1}$ is greater than the specified threshold. In this case, in S31, the transmission characteristics in the frequency range between $f_n$ and $f_{n+1}$ are calculated. Further, in S33, the corrected power value $Q_{n+1}$ is set as the power measurement value $P_n$ for the next measurement point.

Subsequently, in S36, the slope value $S_{n+2}$ is detected at the measurement point n+2, and in S37, the slope function S(f) for the frequency range between $f_{n+1}$ and $f_{n+2}$ is generated. Then, the process in the processor 40 returns to S31. In S31, the transmission characteristics in the frequency range between $f_{n+1}$ and $f_{n+2}$ are calculated based on the power measurement value $P_n$ (in practice, the corrected power value Q at the previous measurement point) and the slope function S(f) for the frequency range between $f_{n+1}$ and $f_{n+2}$. Hereinafter, the transmission characteristics are calculated similarly at each measurement point.

When the processes in S31-S37 are repeatedly executed, the corrected power value Q is respectively generated at a plurality of measurement points. Accordingly, the calculator 46 may generate the fitting curve with respect to the plurality of the corrected power values Q and thereby calculate the pass-band shape in the frequency range in which the transmission characteristics have a slope.

Experiment

An experimental system is as follows. The FM modulation index Δf for generating the probe signal from the CW light is 82 MHz and the FM frequency is 30 kHz. Three relay nodes are provided in the optical transmission path. Each relay node includes an optical amplifier and a wave length switch (WSS). A gain of the optical amplifier is 26 dB. A width of the pass band of the optical bandpass filter (OBPF) 31 included in the transmission characteristics monitoring device 30 is 25 GHz. In the input port of the transmission characteristics monitoring device 30, an optical probe to noise ratio (OPNR) of the received light is 15 dB.

FIGS. 17A and 17B illustrate an example of experimental results on the measurement of the transmission characteristics. In FIG. 17A, characteristics A indicate the pass-band shape (PBS) at the time when the ASE noise is not generated. Note that the characteristics A are obtained by measuring the pass-band shape of the WSS using a measuring device and by superimposing the pass bands obtained by the measurement.

Characteristics B indicate measurement values of the average power of the received light at the transmission characteristics monitoring device 30. The received light includes the probe signal. In the frequency range in which the transmission characteristics are flat, the characteristics A and B approximately coincide with each other. However, in the frequency range in which the transmission characteristics have a slope, since the power of the probe signal becomes small, an influence of ASE noise is exerted. As a result, in the frequency range in which the transmission characteristics have a slope, the characteristics B deviate from the characteristics A. Thus, it is difficult to calculate the pass-band shape of the optical transmission path based on only the average power of the received light.

Characteristics C indicate a slope of the transmission characteristics. The slope of the transmission characteristics is calculated by dividing the amplitude of the power variation of the received light by the FM modulation index Δf of the probe signal. Characteristics D, represented by a broken line, indicate the pass-band shape of the optical transmission path calculated by the transmission characteristics monitoring device 30. In these experimental results, the characteristics A and D approximately coincide with each other throughout the frequency range.

FIG. 17B illustrates a normalized mean square error (NMSE) between the characteristics A and D. According to these experimental results, it is indicated that even when the OPNR of the received light is low (for example, even when the ASE noise is great), the error is sufficiently small between the pass-band shape (the characteristics A) obtained at the time when the ASE noise is not generated and the pass-band shape (the characteristics D) calculated by the transmission characteristics monitoring device 30 at the time when the ASE noise is generated.

Other Embodiments

Figure 18:
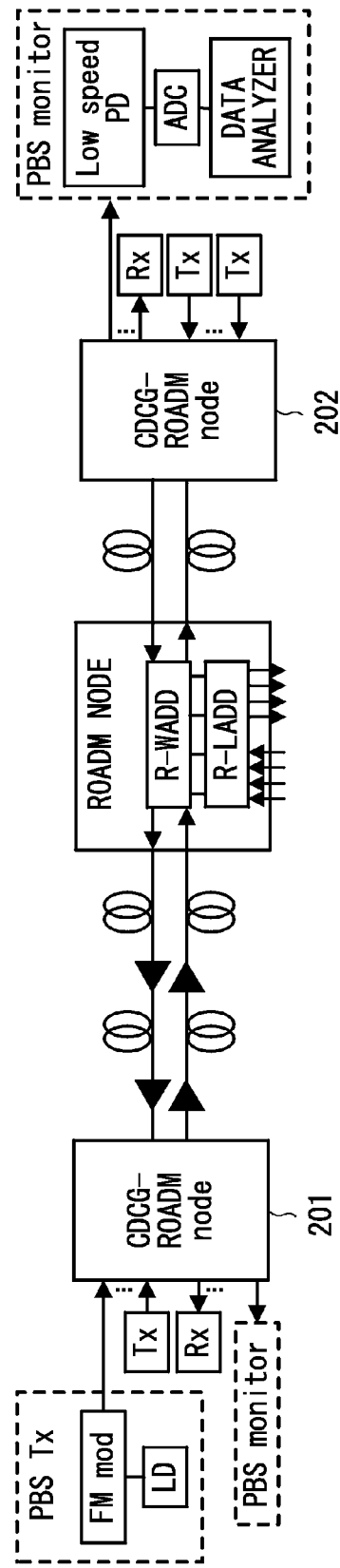
FIG. 18 illustrates an example of a transmission system according to another embodiment.

FIG. 18 illustrates a transmission system according to another embodiment. In this example, the transmission characteristics of the optical transmission path are monitored between nodes 201 and 202. A CDCG (colorless, directionless, contentionless, gridless)-ROADM is implemented in each of the nodes 201 and 202. Further, an optical amplifier and a ROADM are implemented between the nodes 201 and 202.

A PBS_Tx corresponds to the probe signal transmitter 20. Specifically, the PBS_Tx includes the CW light source (LD) and the frequency modulator (FM_Mod). A PBS monitor corresponds to the transmission characteristics monitoring device 30. Specifically, the PBS monitor includes a low-speed PD, the ADC, and a data analyzer. The data analyzer is realized, for example, by a processor system that includes a processor element and a memory.

The probe signal output from the PBS_Tx and other optical signals are multiplexed in the WDM optical signal. The CDCG-ROADM implemented in the node 202 extracts the probe signal from the received WDM optical signal and guides the extracted probe signal to the PBS monitor.

Figures 19A, 19B:
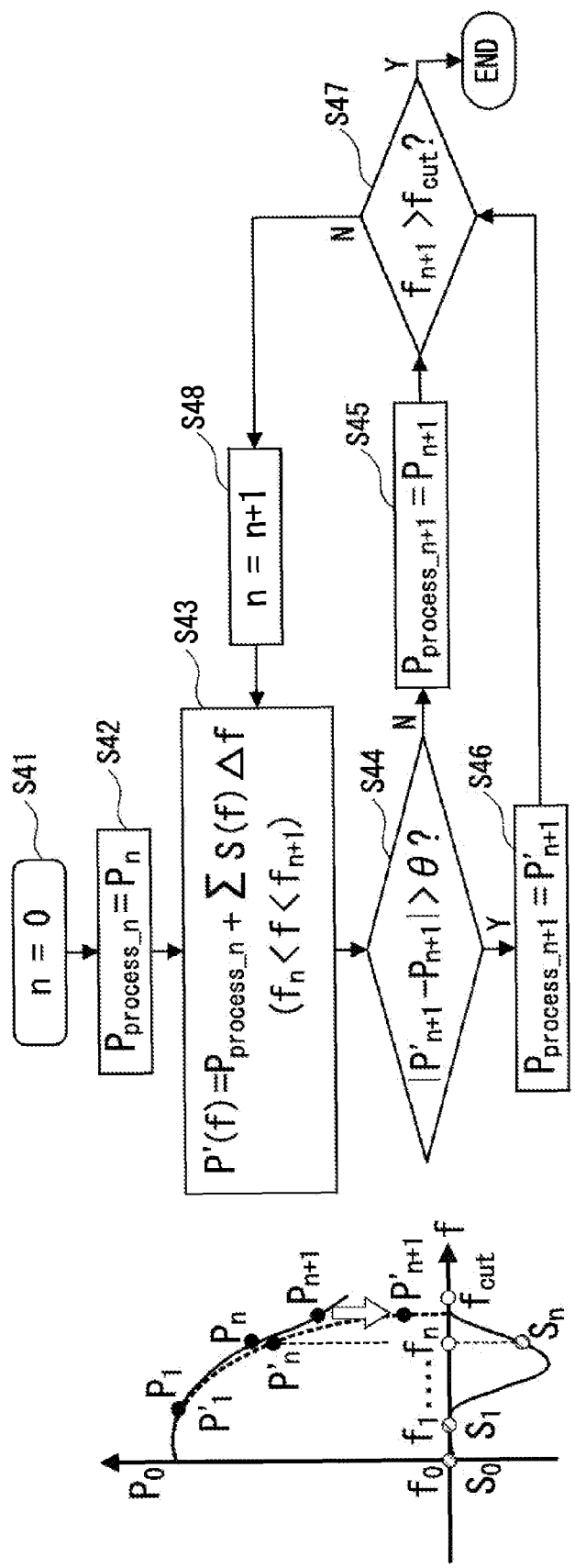
FIGS. 19A and 19B illustrate an example of the process in a data analyzer of a PBS monitor.

FIGS. 19A and 19B illustrate an example of the process in the data analyzer in the PBS monitor. In FIG. 19A, $P_i$ (i=0, 1, ... n, ... ) represents a power measurement value at a measurement point i. $S_i$ (i=0, 1, ... n, ... ) represents a measurement value of a slope of the transmission characteristics at the measurement point i. The slope S is expressed using the following formula.

$$S = \Delta P / \Delta f$$

P' represents a power value corrected using an integral of the slope of the transmission characteristics. Specifically, the corrected power value is expressed using the following formula.

$$P'_{n+1}(f) = P_n + \Sigma S(f) df$$

The slope S(f) in the frequency range between $f_n$ and $f_{n+1}$ is generated by an approximated polynomial based on the slope of the transmission characteristics measured at two or more measurement points including the measurement points n and n+1.

FIG. 19B is a flowchart illustrating an example of the process in the data analyzer. In S41, the data analyzer initializes the variable n to zero. The variable n identifies the measurement point. In S42, the data analyzer gives the power measurement value $P_n$ obtained at the measurement point n to a variable $P_{process\_n}$. In S43, the data analyzer calculates a corrected power value at the measurement point n+1 using an integral interpolation.

In S44, the data analyzer determines whether the difference between the power measurement value ($P_{n+1}$) and the corrected power value ($P'_{n+1}$) is greater than a threshold θ with respect to the measurement point n+1. When this difference is not greater than the threshold θ, the data analyzer gives to the power measurement value $P_{n+1}$ obtained at the measurement point n+1 to a variable $P_{process\_n+1}$ in S45. On the other hand, when the above-described difference is greater than the threshold θ, the data analyzer gives the corrected power value $P'_{n+1}$ obtained at the measurement point n+1 to the variable $P_{process\_n+1}$ in S46. In S47, the data analyzer determines whether the frequency of the measurement point has reached an end frequency $f_{cut}$. When the frequency of the measurement point has not reached the end frequency $f_{cut}$, the variable n is incremented in S48 and then the process in the data analyzer returns to S43.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A transmission characteristics monitoring device that monitors transmission characteristics of an optical transmission path between a first node and a second node, the transmission characteristics monitoring device comprising:
a photo detector configured to convert a frequency modulated optical signal transmitted from a transmitter implemented in the first node into an electric signal in the second node; and
a processor configured to:
detect an average power of the frequency modulated optical signal based on the electric signal,
detect an amplitude of a power variation of the frequency modulated optical signal based on the electric signal,
detect a slope of the transmission characteristics with respect to a frequency based on the detected amplitude,
obtain a first power measurement value that indicates an average power detected when a center frequency of the frequency modulated optical signal is a first frequency,
obtain a first slope value that indicates a slope detected when the center frequency of the frequency modulated optical signal is the first frequency, obtain a second power measurement value that indicates an average power detected when the center frequency of the frequency modulated optical signal is a second frequency, obtain a second slope value that indicates a slope detected when the center frequency of the frequency modulated optical signal is the second frequency, generate a slope function that represents a slope of the transmission characteristics with respect to a frequency for a frequency range between the first frequency and the second frequency based on the first slope value and the second slope value, calculate an integral of the slope function for the frequency range, generate a corrected power value by adding the integral of the slope function to the first power measurement value, determine whether a difference between the second power measurement value and the corrected power value is greater than a specified threshold, calculate the transmission characteristics at the second frequency based on the second power measurement value when the difference is smaller than the specified threshold, and calculate the transmission characteristics at the second frequency based on the corrected power value when the difference is greater than the specified threshold.

2. The transmission characteristics monitoring device according to claim 1, wherein when the transmission characteristics at the second frequency are calculated based on the corrected power value, the processor obtains a third slope value that indicates a slope detected when the center frequency of the frequency modulated optical signal is a third frequency, the processor generates a slope function that represents a slope of the transmission characteristics with respect to a frequency for a frequency range between the second frequency and the third frequency based on the second slope value and the third slope value, and the processor calculates the transmission characteristics at the third frequency based on the corrected power value and the slope function for the frequency range between the second frequency and the third frequency.

3. The transmission characteristics monitoring device according to claim 2, wherein when the difference is greater than the specified threshold, the processor generates a frequency instruction to instruct the center frequency of the frequency modulated signal so that a shift amount from the second frequency to the third frequency is smaller than a shift amount from the first frequency to the second frequency, and reports the generated frequency instruction to the transmitter.

4. A transmission characteristics monitoring device that monitors transmission characteristics of an optical transmission path between a first node and a second node, the transmission characteristics monitoring device comprising:

a photo detector configured to convert a frequency modulated optical signal transmitted from a transmitter implemented in the first node into an electric signal in the second node; and a processor configured to:

detect an average power of the frequency modulated optical signal based on the electric signal, detect an amplitude of a power variation of the frequency modulated optical signal based on the electric signal, detect a slope of the transmission characteristics with respect to a frequency based on the detected amplitude, and calculate the transmission characteristics based on the detected average power and the detected slope, wherein when a center frequency of the frequency modulated optical signal changes from a center of a pass band of the optical transmission path to an end of the pass band, the processor adds an integral of a slope function that represents a slope of the transmission characteristics for a frequency range between a previous measurement point and a target measurement point to a power measurement value detected at the previous measurement point or a corrected power value generated for the previous measurement point with respect to each of a plurality of the measurement points corresponding to the center frequency of the frequency modulated optical signal so as to generate a corrected power value for the target measurement point, and the processor calculates the transmission characteristics based on a plurality of generated corrected power values.

5. The transmission characteristics monitoring device according to claim 4, wherein the processor reports a frequency instruction for setting a measurement point at a first frequency spacing to the transmitter, and after a slope that is greater than a specified slope threshold is detected, the processor reports a frequency instruction for setting a measurement point at a second frequency spacing that is narrower than the first frequency spacing.

6. A transmission characteristics monitoring method for monitoring transmission characteristics of an optical transmission path between a first node and a second node, the transmission characteristics monitoring method comprising:

converting a frequency modulated optical signal transmitted from a transmitter implemented in the first node into an electric signal in the second node;

detecting an average power of the frequency modulated optical signal based on the electric signal;

detecting a slope of the transmission characteristics with respect to a frequency from an amplitude of a power variation of the frequency modulated optical signal detected based on the electric signal;

obtaining a first power measurement value that indicates an average power detected when a center frequency of the frequency modulated optical signal is a first frequency, a first slope value that indicates a slope calculated when the center frequency of the frequency modulated optical signal is the first frequency, a second power measurement value that indicates an average power detected when the center frequency of the frequency modulated optical signal is a second frequency, and a second slope value that indicates a slope calculated when the center frequency of the frequency modulated optical signal is the second frequency;

generating a slope function that represents a slope of the transmission characteristics with respect to a frequency for a frequency range between the first frequency and the second frequency based on the first slope value and the second slope value;

calculating an integral of the slope function for the frequency range;

generating a corrected power value by adding the integral of the slope function to the first power measurement value;

determining whether a difference between the second power measurement value and the corrected power value is greater than a specified threshold;

calculating the transmission characteristics at the second frequency based on the second power measurement value when the difference is smaller than the specified threshold; and calculating the transmission characteristics at the second frequency based on the corrected power value when the difference is greater than the specified threshold.

\* \* \* \* \*